United States Patent
Ohno et al.

(10) Patent No.: US 7,879,432 B2
(45) Date of Patent: *Feb. 1, 2011

(54) HONEYCOMB STRUCTURE

(75) Inventors: Kazushige Ohno, Gifu (JP); Masafumi Kunieda, Gifu (JP); Kazutake Ogyu, Gifu (JP)

(73) Assignee: Ibiden Co., Ltd., Gifu (JP)

( * ) Notice: Subject to any disclaimer, the term of this patent is extended or adjusted under 35 U.S.C. 154(b) by 231 days.

This patent is subject to a terminal disclaimer.

(21) Appl. No.: 11/474,287

(22) Filed: Jun. 26, 2006

(65) Prior Publication Data

US 2006/0292342 A1    Dec. 28, 2006

(30) Foreign Application Priority Data

Jun. 27, 2005 (JP) .................. PCT/JP2005/012264

(51) Int. Cl.
B32B 3/12 (2006.01)
(52) U.S. Cl. ....................................................... 428/116
(58) Field of Classification Search ................. 428/116, 428/117
See application file for complete search history.

(56) References Cited

U.S. PATENT DOCUMENTS

| | | | |
|---|---|---|---|
| 5,518,678 A * | 5/1996 | Miyamoto et al. ..... | 264/177.12 |
| 7,316,722 B2 * | 1/2008 | Komori et al. ................. | 55/523 |
| 2002/0197193 A1 | 12/2002 | Harada et al. | |
| 2003/0170160 A1 | 9/2003 | Morita et al. | |
| 2005/0227869 A1 | 10/2005 | Ohno et al. | |
| 2005/0247038 A1* | 11/2005 | Takahashi ..................... | 55/523 |
| 2005/0266992 A1 | 12/2005 | Ohno et al. | |
| 2008/0118701 A1 | 5/2008 | Ohno et al. | |
| 2008/0119355 A1 | 5/2008 | Ohno et al. | |
| 2008/0176028 A1 | 7/2008 | Ohno et al. | |
| 2008/0187713 A1 | 8/2008 | Ohno et al. | |
| 2008/0241003 A1 | 10/2008 | Ido et al. | |
| 2008/0241005 A1 | 10/2008 | Ido et al. | |
| 2008/0241008 A1 | 10/2008 | Ido et al. | |
| 2008/0260991 A1 | 10/2008 | Konstandopoulos et al. | |
| 2009/0095416 A1 | 4/2009 | Kunieda et al. | |

FOREIGN PATENT DOCUMENTS

| | | |
|---|---|---|
| DE | 43 41 159 A1 | 6/1995 |
| EP | 0 857 511 A2 | 8/1998 |

(Continued)

OTHER PUBLICATIONS

European Search Report.

(Continued)

*Primary Examiner*—Gordon R Baldwin
(74) *Attorney, Agent, or Firm*—Finnegan, Henderson, Farabow, Garrett & Dunner LLP

(57) ABSTRACT

A honeycomb structure 10 includes: multiple honeycomb units 11 having multiple through holes 12; and a seal layer 14 that joins adjacent honeycomb units 11 with each other via respective closed outer faces 13 of the honeycomb units 11 that are different from respective honeycombed faces of the honeycomb units 11. The honeycomb unit 11 includes at least inorganic particles, inorganic fibers and/or whiskers. A cross section area of a honeycombed face of the honeycomb unit perpendicular to the through holes 12 is about 5 to about 50 cm$^2$, and the surface roughness Rz of the outer face 13 is about 5 to about 50 μm.

12 Claims, 11 Drawing Sheets

FOREIGN PATENT DOCUMENTS

| | | | |
|---|---|---|---|
| EP | 1 247 556 A1 | | 10/2002 |
| EP | 1249262 | * | 10/2002 |
| EP | 1 538 133 A1 | | 6/2005 |
| EP | 1 674 147 A1 | | 6/2006 |
| JP | 04-042184 | * | 8/1993 |
| JP | 05-213681 | * | 8/1993 |
| JP | 10-263416 | | 10/1998 |
| JP | 11-088391 | * | 10/2000 |
| JP | 2000-279729 | | 10/2000 |
| JP | 11088391 | * | 10/2000 |
| JP | 2000-005063 | * | 7/2001 |
| JP | 2001-190916 | | 7/2001 |
| JP | 2004-051384 | | 2/2004 |
| WO | WO 2005/063653 A1 | | 7/2005 |
| WO | WO 2005/075075 A1 | | 8/2005 |

OTHER PUBLICATIONS

U.S. Appl. No. 11/473,151.
U.S. Appl. No. 11/475,967.
U.S. Appl. No. 11/541,688.
U.S. Appl. No. 11/925,394.
U.S. Appl. No. 11/853,658.
U.S. Appl. No. 11/928,546.
U.S. Appl. No. 12/238,057.
U.S. Appl. No. 12/245,821.
U.S. Appl. No. 12/246,899.
U.S. Appl. No. 12/246,881.
U.S. Appl. No. 12/239,342.
U.S. Appl. No. 12/246,913.
U.S. Appl. No. 12/246,869.
U.S. Appl. No. 12/248,647.
U.S. Appl. No. 12/248,675.

* cited by examiner (a)

(b)

(a) Example 1

(b) Example 2

(c) Example 3

(d) Example 4

(a) Example 5

(b) Example 6

(c) Example 7

HONEYCOMB STRUCTURE

BACKGROUND ART

1. Field of the Invention

The invention relates to a honeycomb structure.

2. Description of the Related Art

A honeycomb catalyst is generally used to convert the exhaust gas of vehicles. The honeycomb catalyst is conventionally manufactured by making a material of a high specific surface area, for example, active alumina, and a catalyst metal, for example, platinum, carried on the surface of an integral cordierite base honeycomb structure of low thermal expansion characteristics. An alkaline earth metal, such as Ba, is carried on the honeycomb structure as a NOx storage agent to treat NOx in an excess oxygen atmosphere of, for example, lean burn engines and diesel engines. The enhanced conversion performance is attained by improving the potential for bringing the exhaust gas into contact with the noble metal catalyst and the NOx storage agent. For this purpose, it is required to increase the specific surface area of the carrier while decreasing the particle size of the noble metal and making the particles of the noble metal highly dispersed. A simple increase in the carried amount of the material having a high specific surface area, for example, active alumina, may, however, only increase the thickness of an alumina layer, while not significantly increasing the contact potential and undesirably heightening a pressure loss. One proposed technique accordingly specifies the shape of cells, the cell density, and the wall thickness to enhance the contact potential (see, for example, JP-A10-263416). Another known honeycomb structure is manufactured by extrusion molding a material of a high specific surface area with inorganic fibers and an inorganic binder (see, for example, JP-A 5-213681). One joining a honeycomb unit through an adhesive layer so as to enlarge such a honeycomb structure has been known (for example, see DE-A 4341159). The contents of JP-A 10-263416, JP-A 5-213681, and DE 4341159 A are incorporated by reference herein.

SUMMARY OF THE INVENTION

A honeycomb structure of the present invention includes: multiple honeycomb units having multiple through holes; and a seal layer that joins honeycomb units with each other via respective closed outer faces of the honeycomb units where the through holes are not open. In this honeycomb structure, the honeycomb unit includes at least inorganic particles, inorganic fibers and/or whiskers, a cross section area of a honeycombed face of the honeycomb unit perpendicular to the through holes is about 5 to about 50 $cm^2$, and the surface roughness Rz of the outer face is about 5 to about 50 μm.

In the honeycomb structure of the invention, a ratio of the total sum of the cross section areas of the honeycombed faces of the honeycomb units perpendicular to the through holes to a cross section area of a honeycombed face of the honeycomb structure perpendicular to the through holes is preferably about 85% or more, and more preferably about 90% or more.

In the honeycomb structure of the invention, the surface roughness Rz of the outer face of the honeycomb unit is preferably about 10 to about 30 μm.

The honeycomb structure of the invention preferably has the specific surface area of about 35000 to about 70000 $cm^2$/L.

In the honeycomb structure of the invention, the inorganic particles may include at least one type selected from the group consisting of alumina, silica, zirconia, titania, ceria, mullite, and zeolite.

In the honeycomb structure of the invention, the inorganic fibers and whiskers may include at least one type selected from the group consisting of alumina, silica, silicon carbide, silica alumina, glass, potassium titanate, and aluminum borate.

In the honeycomb structure of the invention, the honeycomb unit may further include an inorganic binder, and the inorganic binder may include at least one type selected from the group consisting of alumina sol, silica sol, titania sol, water glass, sepiolite, and attapulgite.

A catalyst component may be carried on the honeycomb structure. The catalyst component may include at least one type selected among noble metals, alkali metals, alkaline earth metal, and oxides.

The honeycomb structure of the invention may be used for a catalytic converter for converting the exhaust gas of vehicles.

BRIEF DESCRIPTION OF THE DRAWINGS

FIG. 1(a) is a perspective view of a honeycomb unit 11, and FIG. 1(b) is a perspective view of the honeycomb structure 10;

FIG. 5(a) is a front view thereof and FIG. 5(b) is a side view thereof;

DESCRIPTION OF THE PREFERRED EMBODIMENTS

Figure 1:
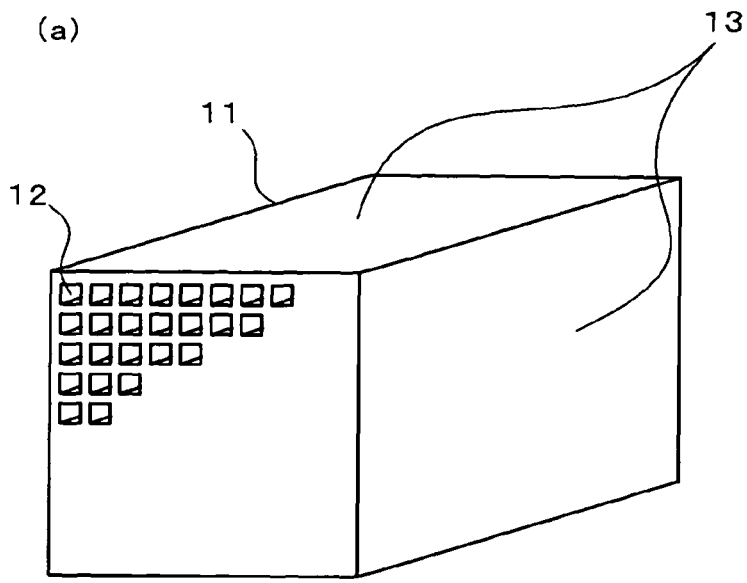
FIG. 1 schematically illustrates a honeycomb structure 10.
Figure 1:
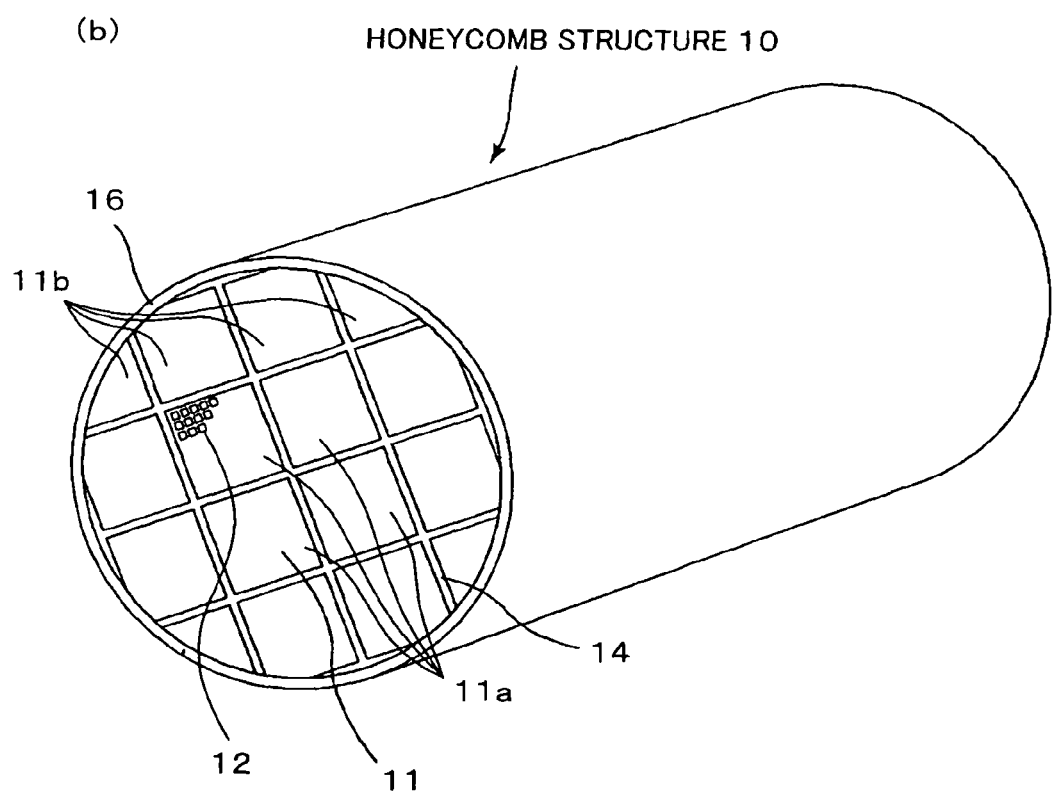

One embodiment regards a honeycomb structure including: multiple honeycomb units having multiple through holes; and a seal layer that joins honeycomb units with each other via respective closed outer faces of the honeycomb units where the through holes are not open. In the honeycomb structure, the honeycomb unit includes at least inorganic particles, inorganic fibers and/or whiskers; a cross section area of a honeycombed face of the honeycomb unit perpendicular to the through holes is about 5 to about 50 cm$^2$; and the surface roughness Rz of the outer face is about 5 to about 50 µm.

Since multiple honeycomb units are joined via the seal layer in the honeycomb structure, strength to thermal shocks and vibrations can be enhanced. It is presumed that even when an abrupt temperature change causes a significant temperature distribution in the honeycomb structure, each honeycomb unit has a relatively small temperature difference, or that the seal layers desirably relaxes the thermal shocks and vibrations. The seal layers are thought to prevent a crack caused by heat stress from being spread over the whole honeycomb structure, by working as frames of the honeycomb structure to keep the shape as a honeycomb structure while ensuring the function of the respective honeycomb units as catalyst carriers. When the cross section area of the face where the through holes are opened is about 5 cm$^2$ or more referring to the size of the honeycomb unit, the cross section area of the seal layer for joining multiple honeycomb units is reduced, and thereby the specific surface area for the catalyst carriage is relatively increased, and the pressure loss is reduced. When the cross section area is about 50 cm$^2$ or less, the unit is not too large, and the heat stress generated in each honeycomb unit can be fully suppressed. Since the surface roughness Rz of the outer faces of the honeycomb units where through holes are not open is about 5 to about 50 µm, sufficient bonding strength of the units can be obtained. When the surface roughness Rz of the outer face is about 5 µm or more, the unevenness of the face is not too small, and sufficient adhesive strength is obtained. When the surface roughness Rz is about 50 µm or less, the unevenness of the face is not too large, and a gap is not easily formed between a concave portion and seal material to enhance the bonding strength. That is, the cross section area of the face perpendicular to the through holes of the honeycomb unit in the range of about 5 to about 50 cm$^2$ and the surface roughness Rz of the outer face in the range of about 5 to about 50 µm keep large specific surface area, suppress pressure loss, have sufficient strength to heat stress, and obtain high durability to a practical level. Therefore, in accordance with the honeycomb structure, the catalyst components can be highly dispersed and strength to thermal shocks and vibrations can be enhanced. The cross section area represents the cross section area of the honeycomb unit as a basic unit constituting the honeycomb structure when the honeycomb structure includes multiple honeycomb units having different cross section areas, and usually represents the maximum cross section area of the honeycomb unit. The surface roughness Rz is referred to as ten-point average roughness, and is calculated based on JIS-B0601: 2001 annex 1 (reference).

In the honeycomb structure of the embodiment, a ratio of the total sum of the cross section areas of the honeycombed faces of the honeycomb units perpendicular to the through holes to a cross section area of a honeycombed face of the honeycomb structure perpendicular to the through holes is preferably about 85% or more, and more preferably about 90% or more. Since the cross section area of the seal layer is reduced and the total cross section area of the honeycomb units is increased when the ratio is about 85% or more, the specific surface area for catalyst carriage is relatively increased, and the pressure loss can be reduced. The pressure loss can be reduced when the ratio is about 90% or more.

The honeycomb structure of the embodiment may be provided with a coating layer covering the outer circumferential face. The coating layer can protect the outer circumferential face to enhance the strength of the honeycomb structure.

In the honeycomb structure of the embodiment, the inorganic particles include at least one type selected from the group consisting of alumina, silica, zirconia, titania, ceria, mullite and zeolite particles. Especially preferable is alumina. The honeycomb unit having a large specific surface area can be comparatively easily produced.

In the honeycomb structure of the embodiment, the inorganic fibers and whiskers include at least one type selected from the group consisting of alumina, silica, silicon carbide, silica alumina, glass, potassium titanate and aluminum borate. Especially preferable is silica alumina fibers. The inorganic fibers and whiskers may have a function as a reinforcing agent of the honeycomb unit. The honeycomb unit having enhanced strength can be comparatively easily produced.

In the honeycomb structure of the embodiment, it is preferable that the honeycomb unit further includes an inorganic binder. The lower temperature for firing the honeycomb unit thus can provide sufficient strength. Examples of the inorganic binders included in the honeycomb structure include inorganic sol and a clay binder. Of these, examples of the inorganic sols include at least one type of inorganic sol selected from alumina sol, silica sol, titania sol and water glass or the like. Examples of the clay binders include at least one type of a clay binder selected from white clay, kaolin, montmorillonite and a double chain structural type clay (sepiolite, attapulgite).

A catalyst component is preferably carried on the honeycomb structure of the embodiment. The catalyst component may include at least one type selected among noble metals, alkali metals, alkaline earth metal and oxides. Examples of the noble metal include at least one type selected among platinum, palladium, and rhodium or the like. Examples of the alkali metal include at least one type selected among potassium and sodium or the like. The alkaline earth metal is, for example, barium. The alkali metal and alkaline earth metal may be included as the catalyst component, and may be in a state of a compound (salt or the like). Examples of the oxides include at least one type selected from one ($LaCoO_3$, $LaMnO_3$ or the like) having a perovskite structure and $CeO_2$ or the like. As the oxides having the perovskite structure, for example, the A site of the perovskite structure (general formula $ABO_3$) is at least one type of element selected from La, Y and Ce or the like. Of these, La is preferable, and examples thereof include one or multiple types of elements in which the B site of the general formula is selected from Fe, Co, Ni, Mn or the like. Some elements of the A site may be replaced by K, Sr and Ag or the like as in $La_{0.75}K_{0.25}CoO_3$ or the like.

The honeycomb structure of the embodiment is preferably used as a catalytic converter (for example, a three-way catalyst or a NOx storage catalyst) for conversion of the exhaust gas of vehicles.

The prior art honeycomb structures cited in the description of the related art have some drawbacks. The sintering of a material having a high specific surface area such as alumina is advanced by heat aging, and the specific surface area is reduced. A catalyst metal, such as platinum carried on is condensed according to the reduction of the specific surface area, the particle diameter is increased, and the specific surface area is reduced. That is, so as to have a higher specific surface area after heat aging (used as a catalyst carrier), it is necessary to increase the specific surface area in an early stage. As described above, the enhanced conversion performance is attained by raising the potential for bringing the exhaust gas into contact with the noble metal catalyst and the NOx storage agent. That is, it is important to increase the specific surface area of the carrier while decreasing the particle size of the catalyst metal and making the particles of the catalyst metal highly dispersed. However, the cordierite base honeycomb structure disclosed in JP-A 10-263416 has material having a high specific surface area, for example, active alumina, and the catalyst metal, for example, platinum, carried on the surface thereof. This prior art technique specifies the shape of cells, the cell density, and the wall thickness to increase the specific surface area of the catalyst carrier and thereby enhance the potential for bringing the exhaust gas into contact with the catalyst metal. This prior art technique, however, does not sufficiently increase the specific surface area of the catalyst carrier. The insufficient specific surface area of the catalyst carrier results in insufficient dispersion of the catalyst metal and poor conversion performance of the exhaust gas after heat aging. A significant increase in the amount of the catalyst metal and size growth of the catalyst carrier may compensate for such insufficiency. Platinum and other noble metals are, however, very expensive and moreover limited precious resources. The size increase of the catalyst carrier is not desirable when the honeycomb structure with the catalyst is mounted on a limited space, such as an automobile.

The honeycomb structure disclosed in JP-A 5-213681 is obtained by extrusion molding a material having a high specific surface area with the inorganic fibers and the inorganic binder. Since a substrate itself is made of a material having a high specific surface area, the honeycomb structure gives a carrier of a high specific surface area and attains sufficiently high dispersion of a catalyst metal. However, the alumina or the like for a substrate could not be fully sintered so as to maintain the specific surface area, and the strength of the substrate was very weak. As described above, when the honeycomb structure is used for vehicles, a space for setting is significantly restricted. Therefore, so as to raise the specific surface area of the carrier per unit volume, a means for thinning a partition wall was used. However, the strength of the substrate became weaker still. Since the alumina or the like has a large coefficient of thermal expansion, a crack is easily generated by heat stress at the time of firing (calcination) and using. Since an external force such as heat stress due to a rapid temperature change and larger vibration at the time of use was added when the honeycomb structure is used for vehicles, the honeycomb structure was easily damaged, and the shape of the honeycomb structure could not be kept. In addition, the function as the catalyst carrier could not be attained.

Since the honeycomb structure is enlarged in the catalyst carrier for vehicles in DE-A 4341159, a honeycomb structure having a cross section area of the honeycomb unit of 200 cm$^2$ or more is shown. However, when the honeycomb structure was used in a situation where heat stress due to a rapid temperature change and larger vibration or the like were added, as described above, the honeycomb structure was easily damaged, and the shape could not be kept. In addition, the function as the catalyst carrier could not be attained.

The invention has been accomplished in view of the foregoing and other problems. And a honeycomb structure of the invention ensures high disperse of catalyst components and the strength to thermal shocks and vibration.

Hereinafter, some modes for carrying out the invention will be described below using the drawings.

The honeycomb structure of the embodiment will be described. FIG. 1 schematically illustrates a honeycomb structure 10 of the embodiment. FIG. 1(a) is a perspective view of a honeycomb unit 11, and FIG. 1(b) is a perspective view of the honeycomb structure 10. The honeycomb structure 10 is constituted as the honeycomb structure having a function for converting toxic substances in the exhaust gas of an engine (for example, hydrocarbon HC, carbon monoxide CO and nitrogen oxide NOx or the like) for catalyst converter.

The honeycomb structure 10 is provided with multiple honeycomb units 11 having multiple through holes 12 arranged in parallel along the longitudinal direction, a seal layer 14 for joining the honeycomb units 11 via the outer faces 13 on which the through holes 12 are not opened, and a coating layer 16 for covering the outer circumferential face on which the through holes 12 are not opened among the multiple honeycomb units 11 joined by the seal layer 14. The honeycomb unit 11 contains a basic unit 11a having a rectangular pillar shape and a modification unit 11b cut so that the corner of the rectangular pillar shape is curved. Of these, the basic units 11a are arranged by two in length and two in width at the center of the honeycomb structure 10, and the outer faces 13 of the adjacent basic units 11a are joined by the seal layer 14 with each other. The modification units 11b are arranged around the basic units 11a arranged by two in length and two in width, and the outer faces 13 of the adjacent modification units 11b or the outer faces 13 of the adjacent modification units 11b and basic units 11a are joined by the seal layer 14. Thus, the basic units 11a and the modification units 11b are joined, and the outer shape of the honeycomb structure 10 is cylindrically formed. The numbers of the basic units 11a and modification units 11b constituting the honeycomb structure 10 may be an arbitrary number based on the size of the honeycomb structure 10 or the honeycomb unit 11. The outer shape of the honeycomb structure 10 may have an arbitrary shape and size. For example, the outer shape may have a square-pillar or an elliptic-pillar shape.

A specific surface area per unit volume of the honeycomb structure 10 is preferably about 28000 m$^2$/L or more, more preferably about 35000 m$^2$/L or more, and most preferably about 38000 m$^2$/L. The specific surface area per unit volume is preferably about 70000 m$^2$/L or less by taking into account the limit of dispersion of the catalyst. The specific surface area per unit volume is obtained by calculating the specific surface area per unit volume of the honeycomb unit from the specific surface area per unit weight by BET specific surface area measurement of the honeycomb unit 11, and by multiplying the ratio of the volume of the honeycomb unit 11 to the whole honeycomb structure 10. That is, since the seal layer 14 hardly contributes to conversion of the exhaust gas, the volume of the seal layer 14 is excepted, and the specific surface area per volume of the honeycomb structure 20 is calculated. The specific surface area per unit volume is calculated by Equation (1) given below.

The cross section area of the face where the through holes 12 are opened is about 5 to about 50 cm$^2$ in the honeycomb unit 11 constituting the honeycomb structure 10. When the cross section area is about 5 cm$^2$ or more, since the cross section area of the seal layer 14 for joining multiple honeycomb units 11 is decreased, the specific surface area for catalyst carriage is relatively increased, and the pressure loss is reduced. When the cross section area is about 50 cm$^2$ or less, the size of the unit is not too large, and the heat stress generated in each honeycomb unit can be fully suppressed. When the cross section area is about 5 to about 50 cm$^2$, a ratio of the seal layer to the honeycomb structure can be adjusted. Thereby, a large specific surface area per unit volume of the honeycomb structure can be kept, and the catalyst component can be highly dispersed. Also, even if an external force such as thermal shocks and vibrations is added, the shape as a honeycomb structure can be kept. The cross section area is preferably about cm$^2$ or more that reduces pressure loss.

In the honeycomb unit 11, the surface roughness Rz of the outer face 13 on which the through holes 12 are not opened is about 5 to about 50 μm. When the surface roughness RZ of the outer face 13 is about 5 μm or more, the surface unevenness is not too small, and sufficient adhesive strength is obtained. When the surface roughness RZ is about 50 μm or less, the surface unevenness is not too large, and a gap is not easily formed between a concave portion and seal material. Thereby, the bonding strength can be enhanced. The surface roughness Rz of the outer face 13 is more preferably about 7 to about 40, and most preferably about 10 to about 30 μm. The surface roughness Rz of the outer face 13 is referred to as ten-point average roughness, and is calculated based on JIS-B0601: 2001 annex 1 (reference). Specifically, in an outline curve (roughness curve of former standard JIS-B0601: 1994) having a standard length obtained by applying a phase compensation band pass filter of a cutoff value λC, the sum of the average of the peak height to the 5th from the maximum peak in descending order and the average of the valley depth to the 5th, from the deepest bottom of a valley in descending order was calculated is the surface roughness Rz herein. The contents of JIS-B0601: 2001 annex 1 and JIS-B0601: 1994 are incorporated by reference herein.

It is preferable that the shape of the honeycomb unit 11 can easily join the honeycomb units 11 with each other, and the section of the face on which the through holes 12 are opened may be a square, a rectangle, a hexagon or a fan. The honeycomb structure 11 has a large number of through holes 12 toward the interior from the front side in FIG. 1(a) and the outer faces 13 having no through holes 12. The wall thickness of the wall between adjoining through holes 12 is preferably in a range of about 0.05 to about 0.35 mm, more preferably about 0.10 to about 0.30 mm, and most preferably about 0.15 to about 0.25 mm. Since the wall thickness of about 0.05 mm or more increases the strength of the honeycomb unit 11, and the wall thickness of about 0.35 mm or less increases the contact surface with exhaust gas, the catalyst performance is increased. The number of through holes per unit cross section area is preferably in a range of about 15.5 to about 186/cm$^2$ (about 100 to about 1200 cpsi), more preferably in a range of about 46.5 to about 170.5/cm$^2$ (about 300 to about 1100 cpsi), and most preferably in a range of about 62.0 to about 155/cm$^2$ (about 400 to about 1000 cpsi). The number of through holes of about 15.5/cm$^2$ or more increases the area of the walls inside the honeycomb unit 11 that are in contact with the exhaust gas, and the number of through holes of about 186/cm$^2$ or less reduces pressure loss and facilitates production of the honeycomb unit. The shape of the through holes formed in the honeycomb unit may have a section of an approximate triangle or an approximate hexagon.

The honeycomb unit 11 includes alumina as the inorganic particles, silica alumina fibers as the inorganic fibers, and silica of the origin of silica sol as the inorganic binder. The inorganic particles included in the honeycomb unit 11 may be, for example, silica, zirconia, titania, ceria, mullite and zeolite particles. The amount of inorganic particles included in the honeycomb structure 10 is preferably in a range of about 30 to about 97% by weight, more preferably in a range of about 30 to about 90% by weight, still more preferably in a range of about 40 to about 80% by weight, and most preferably in a range of about 50 to about 75% by weight. The content of the inorganic particles of about 30% by weight or more can relatively increase the amount of inorganic particles contributing to improvement in specific surface area, and results in a high specific surface area of the honeycomb structure and a high dispersion of the catalyst component carried on the honeycomb structure. The content of the inorganic particles of about 90% by weight or less relatively increases the amount of inorganic fibers contributing to the improvement in strength, and increases the strength of the honeycomb structure.

The inorganic fibers included in the honeycomb unit 11 may be, for example, silica, silicon carbide, glass, potassium titanate and aluminum borate or the like in addition to alumina, and may be the whiskers thereof or the like. The amount of inorganic fibers included in the honeycomb structure 10 is preferably in a range of about 3 to about 70% by weight, more preferably in a range of about 3 to about 50% by weight, still more preferably in a range of about 5 to about 40% by weight, and most preferably in a range of about 8 to about 30% by weight. The content of inorganic fibers of about 3% by weight or more increases the strength of the honeycomb structure, and the content of inorganic fibers of about 50% by weight or less relatively increases the amount of inorganic particles or the like contributing to the improvement in specific surface area, thereby resulting in a high specific surface area of the honeycomb structure and a high dispersion of the catalyst component carried on the honeycomb structure. The aspect ratio of the inorganic fibers and whiskers is preferably in a range of about 2 to about 1000, more preferably in a range of about 5 to about 800, and most preferably in a range of about 10 to about 500. The aspect ratio of the inorganic fibers and whiskers of about 2 or more can heighten the strength of the honeycomb structure 10, and the aspect ratio of about 1000 or less prevents clogging of a mold and improves the moldability. When the aspect ratio of the inorganic fibers and whiskers has a distribution, the average value may be set.

Examples of the inorganic binders included in the honeycomb unit 11 at the time of manufacture include inorganic sol and a clay binder. Of these, the inorganic sol may be, for example, alumina sol, titania sol and water glass or the like. The clay binder may be, for example, white clay, kaolin, montmorillonite and a double chain structural type clay (sepiolite, attapulgite) or the like. The alumina sol, the silica sol, the water glass and the titania sol become alumina, silica and titania or the like by subsequent processing respectively. The amount of inorganic binder included in the honeycomb structure 10 as the solid content is preferably about 50% by weight or less, more preferably in a range of about 5 to about 50% by weight, still more preferably in a range of about 10 to about 40% by weight, and most preferably in a range of about 15 to about 35% by weight. The content of inorganic binder of about 50% or less improves the moldability. The honeycomb structure 10 may not include the inorganic binder.

The following describes an example of a manufacturing method of the honeycomb structure 10 of the invention. The method first prepares a honeycomb unit molded body by extrusion molding a material paste, which is mainly composed of inorganic particles, inorganic fibers and/or whiskers, and inorganic binder. The surface roughness Rz of the outer face 13 of the honeycomb unit 11 can be changed by changing the particle diameter of the inorganic particle, the diameter, length and aspect ratio of the inorganic fiber and/or the whisker, and a mixing ratio of ones included in the material paste such as the inorganic particle and inorganic fiber and/or whisker. Therefore, it is preferable to suitably select the particle diameter of the inorganic particle, the diameter, length and aspect ratio of the inorganic fiber and/or the whisker, and the mixing ratio thereof so that the surface roughness Rz of the outer face 13 is within the range of about 5 to about 50 μm. The processing for changing the surface roughness Rz of the outer face 13 after producing the honeycomb unit 11 can be omitted. The material paste may further include an organic binder, a dispersion medium, and a molding aid according to the moldability. The organic binder used is, for example, at least one type selected among methylcellulose, carboxymethylcellulose, hydroxyethylcellulose, polyethyleneglycol, phenol resin, and epoxy resin. The content of the organic binder used is preferably in a range of about 1 to about 10% by weight relative to the total 100 parts by weight of the inorganic particles, the inorganic fibers and/or the whiskers, and the inorganic binder. The dispersion medium used is, for example, water, an organic solvent, such as benzene, or an alcohol, such as methanol. The molding aid is, for example, ethyleneglycol, dextrin, fatty acid, fatty acid soap, or polyalcohol.

The method preferably mixes or blends the material paste with, for example, a mixer or an attritor, or kneads the material paste with a kneader. The material paste may be molded into the shape having through holes by any suitable method, for example, by extrusion molding. At this time, the material paste may be molded so that the cross section area of the face on which the through holes 12 are opened become about 5 to about 50 cm$^2$. Although the molding shape can be an arbitrary shape, the shape is preferably a square-pillar or the like.

The method preferably dries the molded body. A dryer used for this drying step is, for example, a microwave dryer, a hot air dryer, a dielectric dryer, a reduced pressure dryer, a vacuum dryer, or a freeze dryer. The method preferably degreases the molded body. The degreasing conditions are appropriately selected according to the types and amounts of organic substances included in the molded body, for example, about 400° C. for about 2 hours. The method preferably fires the molded body. The firing conditions are not specifically limited, but the firing temperature is preferably in a range of about 600 to about 1200° C., more preferably about 600 to about 1000° C. The firing temperature of about 600° C. or more advances the sintering of the inorganic particles or the like which heightens the strength of the honeycomb structure 10. The firing temperature of about 1200° C. or less prevents excessive sintering of the inorganic particles which suppresses a decrease in the specific surface area per unit volume to result in sufficiently high dispersion of the carried catalyst component. The method accordingly makes possible the honeycomb unit 11 having multiple through holes.

Although the surface roughness Rz of the outer face 13 of the honeycomb unit 11 can be controlled by changing the average particle diameter and mixing amount or the like of the material, in addition, the surface roughness Rz can be adjusted by changing the firing conditions. The surface roughness Rz of the outer face 13 can also be roughened by blast processing after obtaining the honeycomb unit 11. Examples of blast processing include sandblast processing, shot blast processing and liquid honing. In the case of sandblast processing, referring to the loose abrasive grains to be used, examples of alumina abrading agents include alundum (A), white alundum (WA) and emery. Examples of carbon base abrading agents include carbon (C) and green carborundum (GC). Other examples include abrading agents such as zirconia powder, ceramic bead, stainless steel powder and boron carbide. As the particle size of the loose abrasive grain, for example, a loose abrasive grain having an average particle diameter of 1 to 100 µm can be used. Examples of the shot blast processing include a stainless steel shot and a zinc shot, and for example, the stainless steel and zinc having an average particle diameter of 0.3 mm can be used as the loose abrasive grains. The surface roughness Rz of outer face 13 can also be smoothed, for example, by polish processing or the like using a grindstone including the above alumina abrading agent, carbon abrading agent and zirconia powder or the like having an average particle diameter of 1 to 11 µm (#800 to #1000).

Multiple honeycomb units 11 may successively be joined with one another by means of seal layers 14 made of a sealing paste, be dried, and be solidified to produce a honeycomb unit assembly of a predetermined size. The sealing paste used may be a mixture of inorganic binder and inorganic particles, a mixture of inorganic binder and inorganic fiber, or a mixture of inorganic binder, inorganic particle, and inorganic fiber. The sealing paste may further include an organic binder. The organic binder used may be one or more types selected among polyvinyl alcohol, methylcellulose, ethylcellulose, and carboxymethylcellulose.

The thickness of the seal layer 14 for joining adjacent honeycomb units 11 with each other is preferably in a range of about 0.5 to about 2 mm. The thickness of the seal layer of about 0.5 mm or more gives a sufficient bonding strength. While the seal layer 14 does not function as the catalyst carrier, the thickness of about 2 mm or less suppresses a decrease in the specific surface area per unit volume of the honeycomb structure 10 and allows for a sufficiently high dispersion of the catalyst component carried on the honeycomb structure. The thickness of the seal layer 14 of about 2 mm or less reduces the pressure loss. The number of honeycomb units 11 joined together may be adequately determined for the desirable size of the honeycomb structure 10 used as the honeycomb catalyst. The honeycomb units 11 joined together by means of the seal layers may be cut or polished adequately according to the desired size of the honeycomb structure 10.

The method may apply, dry, and solidify a coating paste onto the outer circumferential face (side face) of the honeycomb structure 10 without the through holes 12 to form a coating layer 16. The coating layer can protect the outer circumferential face to enhance the strength of the honeycomb structure. The coating paste used may be, for example, identical to or different from the sealing paste. The coating paste may have an identical mixing ratio to or a different mixing ratio from that of the sealing paste. The thickness of the coating layer 16 is preferably in a range of about 0.1 to about 2 mm. The thickness of the coating layer of about 0.1 mm or more can protect the outer circumferential face to enhance the strength of the honeycomb structure. The thickness of about 2 mm or less can prevent the specific surface area per unit volume of the honeycomb structure 10 from reducing, to allow a sufficiently high dispersion of the catalyst component carried on the honeycomb structure.

It is preferable that the multiple honeycomb units 11 joined together by means of the seal layers is calcined (after formation of the coating layer 16 if any). This calcination step degreases and removes the organic binders that may be included in the sealing paste and the coating paste. The calcinations conditions are appropriately determined according to the types and amounts of the included organic substances, for example, about 700° C. for about 2 hours. In this way, the honeycomb structure 10 shown in FIG. 1(b) can be obtained. The method of manufacturing the honeycomb structure 10 joins a plurality of the honeycomb units 11 together by means of seal layers 14, cuts and polishes the joined assembly to a cylindrical shape, and coats the outer circumferential face of the cylindrical assembly without the through holes 12 to form a coating layer 16. The cutting and polishing step may be omitted from the manufacturing process of a honeycomb structure in a predetermined shape (for example, the cylindrical honeycomb structure shown in FIG. 1(b)) by molding the shapes of the honeycomb units 11 having fan-shaped cross sections and square cross sections and joining the honeycomb units 11 of the predetermined shapes together.

Referring to the application of the honeycomb structure 10, the honeycomb structure is preferably used as a catalyst carrier of a catalytic converter for conversion of the exhaust gas of the vehicle. Carriage of a catalyst component on the honeycomb structure 10 gives a honeycomb catalyst. The catalyst component used may be, for example, noble metals, alkali metals, alkaline earth metals, and oxides. Examples of the noble metal include at least one type selected from platinum, palladium, and rhodium. Examples of the alkali metal include at least one type selected from potassium and sodium or the like. The alkaline earth metal used is, for example, barium. The oxide used may be perovskite (for example, $La_{0.75}K_{0.25}MnO_3$), $CeO_2$ or the like. The alkali metal and alkaline earth metal may be included as the catalyst component, and may be used in a state of a compound (salt or the like). The honeycomb catalyst is preferably used, for example, as a catalytic converter (a three-way catalyst or a NOx storage catalyst) for conversion of the exhaust gas of a vehicle. Referring to the carriage of the catalyst component, for example, the catalyst component may be carried after preparing of the honeycomb structure, or may be carried on the inorganic particles of the material paste. The method of carriage of the catalyst component is, for example, impregnation.

In the application as a catalyst carrier for conversion of the exhaust gas of a diesel engine, the honeycomb structure of the invention may be combined with a diesel particulate filter (DPF), which has a honeycomb structure of, for example, silicon carbide and functions to filter out and combust particulate materials (PM) included in the exhaust gas. The honeycomb structure 10 may be located in the upstream of or in the downstream of the DPF. In the arrangement of the honeycomb structure 10 in the upstream, the heat generated by an exothermic reaction in the upstream honeycomb structure is transmitted to the downstream DPF to accelerate a temperature increase for regeneration of the DPF. In the arrangement of the honeycomb structure of the invention in the downstream, on the other hand, the upstream DPF filters out the PM included in the exhaust gas and prevents clogging of the through holes in the downstream honeycomb structure of the invention. The downstream honeycomb structure 10 treats the gas component generated by incomplete combustion of the PM in the upstream DPF. The honeycomb structure 10 can be used for applications described in the above background art, and can also be used for applications (for example, absorbent or the like for absorbing the gas component and the fluid component) used without carriage of the catalyst component without being limited thereto.

According to the honeycomb structure 10 of the embodiment described above in detail, the cross section area of the honeycombed face of the honeycomb unit 11 perpendicular to the through holes 12 is about 5 to about 50 $cm^2$, and the surface roughness Rz of the outer face 13 is about 5 to about 50 μm, can highly disperse the catalyst component, and can enhance the strength to thermal shocks and vibrations.

EXAMPLES

Next, examples of the invention will be described using examples. Although examples of honeycomb structures produced under various conditions are described below, the invention is not limited to these examples.

Example 1

The process of example 1 mixed 40% by weight of γ-alumina particles (average particle diameter: 2 μm) as the inorganic particles, 10% by weight of silica alumina fibers (average fiber diameter: 10 μm, average fiber length: 100 μm, aspect ratio: 10) as the inorganic fibers, and 50% by weight of silica sol (solid content: 30% by weight) as the inorganic binder to give a mixture. The process added 6 parts by weight of methylcellulose as an organic binder and small amounts of a plasticizer and a lubricant with stirring to 100 parts by weight of the mixture and sufficiently kneaded the whole mixed composition. The mixed composition was extrusion molded by an extruder to a raw molded body.

Figure 2:
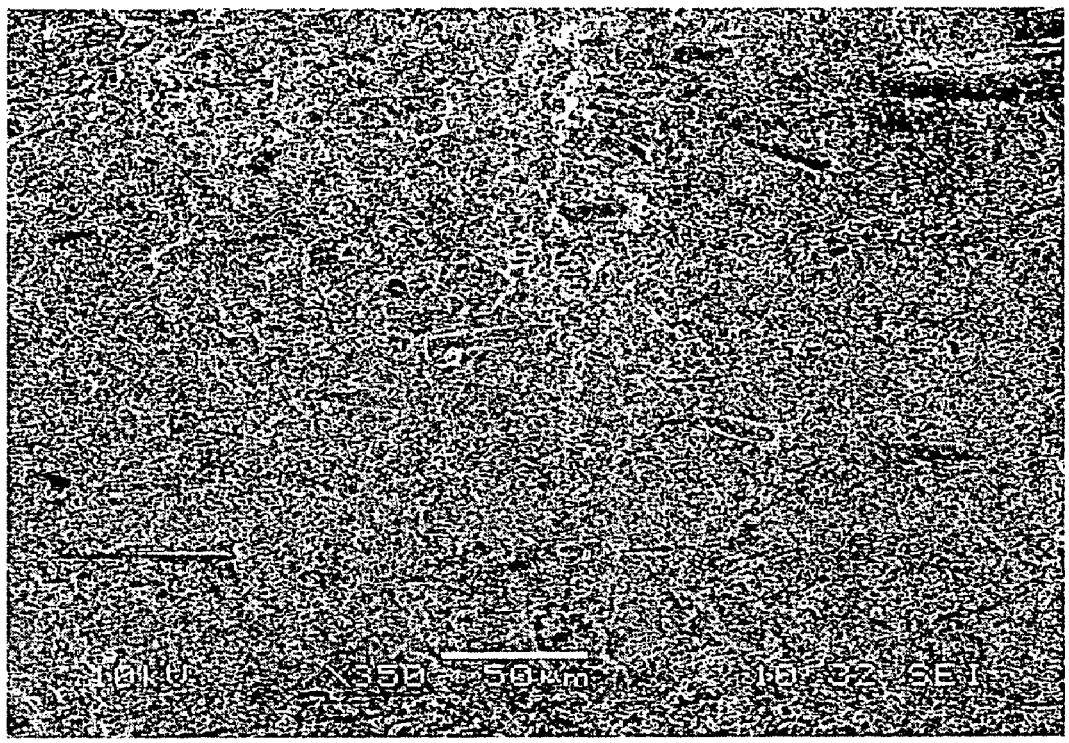
FIG. 2 is a SEM photograph of an outer face 13 of the honeycomb unit 11 of the invention.

The raw molded body was sufficiently dried with a microwave dryer and a hot air dryer and was kept at 400° C. for 2 hours for degreasing. The degreased molded object was fired at 800° C. for 2 hours to give a square-pillar honeycomb unit 11 (34.3 mm×34.3 mm×150 mm) having a cell density of 93 cells/$cm^2$ (600 cpsi), a wall thickness of 0.2 mm and a cell shape of tetragonum (square). FIG. 2 shows the electron microscope (SEM) photograph of the outer face 13 of the honeycomb unit 11. The SEM photograph shows that silica alumina fibers are oriented along the extruding direction of the material paste in the honeycomb unit 11.

Figure 3:
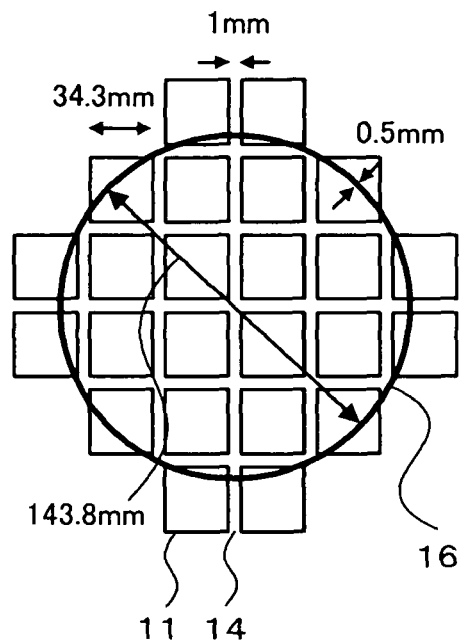
FIG. 3 schematically illustrates examples in which the multiple honeycomb units 11 are joined, FIGS. 3(a), (b), (c), (d) schematically illustrate an example 1, an example 2, an example 3 and an example 4 respectively.
Figure 3:
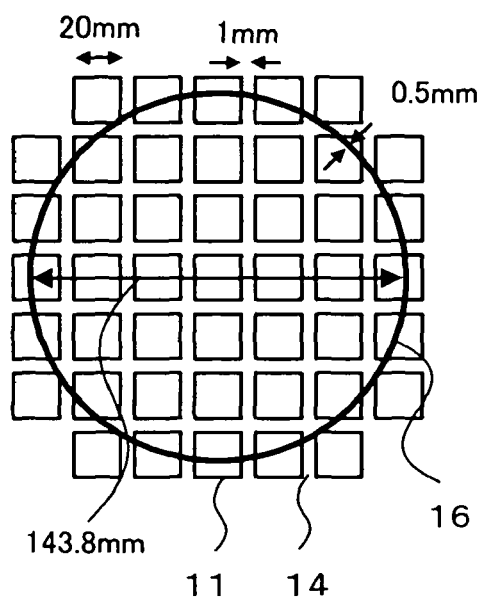
Figure 3:
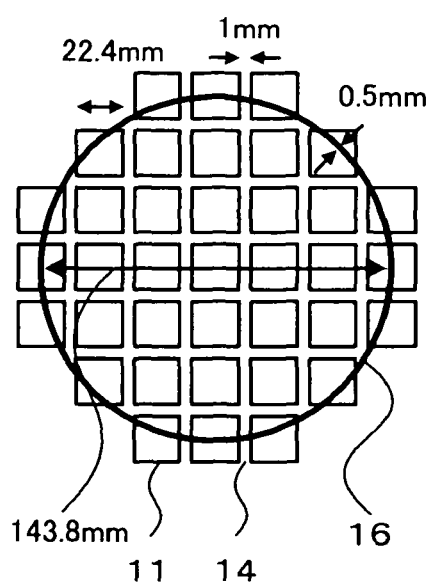
Figure 3:
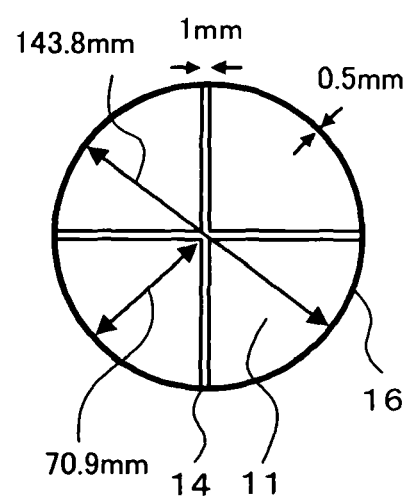

A heat-resisting sealing paste was produced by mixing 29% by weight of γ-alumina particles (average particle diameter: 2 μm), 7% by weight of silica alumina fibers (average fiber diameter: 10 μm, average fiber length: 100 μm), 34% by weight of silica sol (solid content: 30% by weight), 5% by weight of carboxymethylcellulose, and 25% by weight of water. Multiple honeycomb units 11 were joined with one another by the sealing paste. FIG. 3(a) shows a honeycomb unit assembly, which is obtained by joining multiple honeycomb units 11 seen from a face (hereinafter referred to as front face) having through holes. The sealing paste was applied on the outer faces 13 of the honeycomb units 11 to form the seal layers 14 having a thickness of 1 mm, and the multiple honeycomb units 11 with the seal layers 14 were joined with one another and were fixed to form each honeycomb unit assembly. Each honeycomb unit assembly was cut with a diamond cutter into a cylindrical shape having a practically symmetric front face with respect to a point. The cylindrical outer surface of the cylindrical honeycomb unit assembly except the honeycombed face perpendicular to the through holes was coated with the above-described sealing paste in a thickness of 0.5 mm. The cylindrical honeycomb unit assembly was dried at 120° C. and was kept at 700° C. for 2 hours for degreasing of the seal layer and the coating layer. This gave the cylindrical honeycomb structure 10 (143.8 mmφ in diameter×150 mm in height). The inorganic particle component, unit shape, unit cross section area, unit area ratio (here and hereinafter represents a ratio of the total sum of the cross section areas of the honeycombed faces of the honeycomb units perpendicular to the through holes to the cross section area of the honeycombed face of the honeycomb structure perpendicular to the through holes), and seal layer area ratio (here and hereinafter represents a ratio of the total sum of the cross section areas of the faces of the seal layer and coating layer perpendicular to the through holes to the cross section areas of the honeycombed faces of the honeycomb structure perpendicular to the through holes) of the honeycomb structure 10 are shown in Table 1. Table 1 also shows the specifications of examples 2 to 29 described below. In all the samples shown in Table 1, the inorganic fibers are silica alumina fibers (average fiber diameter: 10 μm, average fiber length: 100 μm, aspect ratio: 10), and the inorganic binder is silica sol (solid content: 30% by weight).

TABLE 1

| Sample[1] | Inorganic particles | Unit shape cm | Unit cross section area cm$^2$ | Unit area ratio % | Seal layer area ratio[2] % |
|---|---|---|---|---|---|
| Example 1 | Alumina | 3.43 cm square | 11.8 | 93.5 | 6.5 |
| Example 2 | Alumina | 2.00 cm square | 4.0 | 89.7 | 10.3 |
| Example 3 | Alumina | 2.24 cm square | 5.0 | 90.2 | 9.8 |
| Example 4 | Alumina | 7.09 cm fan | 39.5 | 96.9 | 3.1 |
| Example 5 | Alumina | 7.10 cm square | 50.0 | 95.5 | 4.5 |
| Example 6 | Alumina | 7.41 cm square | 55.0 | 95.6 | 4.4 |
| Example 7 | Alumina | Integral | 162.0 | 100 | 0 |
| Example 8 | Titania | 3.43 cm square | 11.8 | 93.5 | 6.5 |
| Example 9 | Titania | 2.00 cm square | 4.0 | 89.7 | 10.3 |
| Example 10 | Titania | 2.24 cm square | 5.0 | 90.2 | 9.8 |
| Example 11 | Titania | 7.09 cm fan | 39.5 | 96.9 | 3.1 |
| Example 12 | Titania | 7.10 cm square | 50.0 | 95.5 | 4.5 |
| Example 13 | Titania | 7.41 cm square | 55.0 | 95.6 | 4.4 |
| Example 14 | Titania | Integral | 162.0 | 100 | 0 |
| Example 15 | Silica | 3.43 cm square | 11.8 | 93.5 | 6.5 |
| Example 16 | Silica | 2.00 cm square | 4.0 | 89.7 | 10.3 |
| Example 17 | Silica | 2.24 cm square | 5.0 | 90.2 | 9.8 |
| Example 18 | Silica | 7.09 cm fan | 39.5 | 96.9 | 3.1 |
| Example 19 | Silica | 7.10 cm square | 50.0 | 95.5 | 4.5 |
| Example 20 | Silica | 7.41 cm square | 55.0 | 95.6 | 4.4 |
| Example 21 | Silica | Integral | 162.0 | 100 | 0 |
| Example 22 | Zirconia | 3.43 cm square | 11.8 | 93.5 | 6.5 |
| Example 23 | Zirconia | 2.00 cm square | 4.0 | 89.7 | 10.3 |
| Example 24 | Zirconia | 2.24 cm square | 5.0 | 90.2 | 9.8 |
| Example 25 | Zirconia | 7.09 cm fan | 39.5 | 96.9 | 3.1 |
| Example 26 | Zirconia | 7.10 cm square | 50.0 | 95.5 | 4.5 |
| Example 27 | Zirconia | 7.41 cm square | 55.0 | 95.6 | 4.4 |
| Example 28 | Zirconia | Integral | 162.0 | 100 | 0 |
| Example 29 | Cordierite + alumina | Integral | 162.0 | 100 | 0 |

[1] Inorganic fibers = silica alumina fibers (diameter: 10 μm, length: 100 μm, aspect ratio: 10)
[2] The area of a coating layer is included.

Examples 2 to 7

Figure 4:
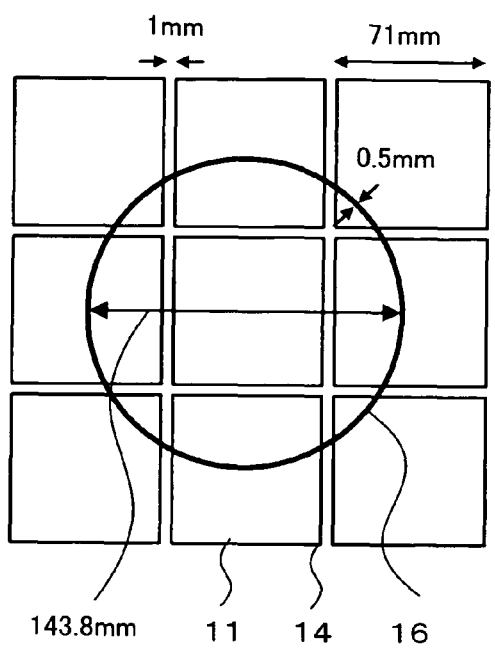
FIG. 4 schematically illustrates examples in which the multiple honeycomb units 11 are joined, FIGS. 4(a), (b), (c) schematically illustrate an example 5, an example 6 and an example 7 respectively.
Figure 4:
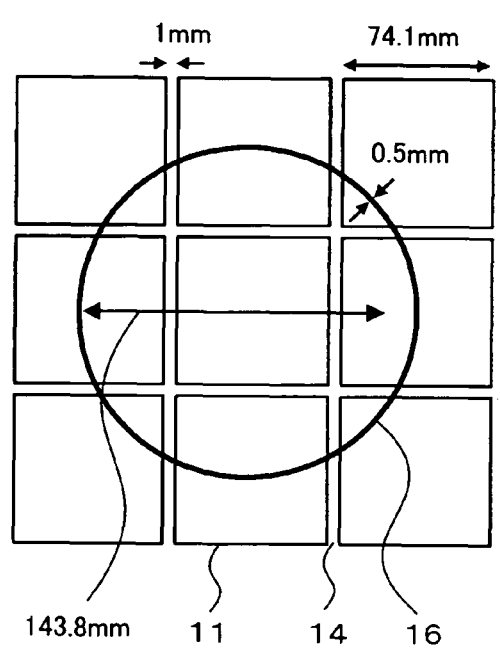
Figure 4:
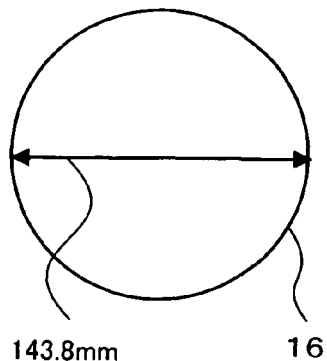

The honeycomb structures 10 were produced in the same manner as in the example 1 except for becoming the shapes shown in Table 1. The shapes of the honeycomb unit assemblies of the examples 2, 3 and 4 are respectively shown in FIGS. 3(b), (c) and (d), and the shapes of the honeycomb unit assemblies of the examples 5, 6 and 7 are respectively shown in FIGS. 4(a), (b) and (c). In the example 7, the honeycomb structure 10 is integrally molded, and a joining process and a cutting process were not performed.

Examples 8 to 14

The honeycomb units 11 were produced in the same manner as in the example 1 except for using titania particles (average particle diameter: 2 μm) as the inorganic particles and becoming the shapes shown in Table 1. Then, the honeycomb structures 10 were produced in the same manner as in the example 1 except for using the titania particles (average particle diameter: 2 μm) as the inorganic particles of the seal layer and coating layer. The shapes of the honeycomb unit assemblies of the examples 8 to 11 are respectively the same as those of FIGS. 3(a) to (d), and the shapes of the honeycomb unit assemblies of the examples 12 to 14 are respectively the same as those of FIG. 4(a) to (c). In the example 14, the honeycomb structure 10 is integrally molded.

Examples 15 to 21

The honeycomb units 11 were produced in the same manner as in the example 1 except for using the silica particles (average particle diameter: 2 μm) as the inorganic particles and becoming the shapes shown in Table 1. Then, the honeycomb structures 10 were produced in the same manner as in the example 1 except for using the silica particles (average particle diameter: 2 μm) as the inorganic particles of the seal layer and coating layer. The shapes of the honeycomb unit assemblies of the examples 15 to 18 are respectively the same as those of FIGS. 3(a) to (d), and the shapes of the honeycomb unit assemblies of the examples 19 to 21 are respectively the same as those of FIG. 4(a) to (c). In the example 21, the honeycomb structure 10 is integrally molded.

Examples 22 to 28

The honeycomb units 11 were produced in the same manner as in the example 1 except for using the zirconia particles (average particle diameter: 2 μm) as the inorganic particles and becoming the shapes shown in Table 1. Then, the honeycomb structures 10 were produced in the same manner as in the example 1 except for using the zirconia particles (average particle diameter: 2 μm) as the inorganic particles of the seal layer and coating layer. The shapes of the honeycomb unit assemblies of the examples 22 to 25 are respectively the same as those of FIGS. 3(a) to (d), and the shapes of the honeycomb unit assemblies of the examples 26 to 28 are respectively the same as those of FIGS. 4(a) to (c). In the example 28, the honeycomb structure 10 is integrally molded.

Example 29

A commercially available cylindrical cordierite honeycomb structure 10 (143.8 mmϕ in diameter×150 mm in height), which had alumina as a catalyst carrier layer inside the through holes, was used as an example 29. The honeycomb structure had hexagonal cells at a cell density of 62 cells/cm$^2$ (400 cpsi) and a wall thickness of 0.18 mm. The shape of the honeycomb structure seen from the front face is the same as that of FIG. 4(c).

Examples 30 to 34

The honeycomb units 11 were produced in the same manner as in the example 1 except for using the silica alumina fibers having the shapes shown in Table 2 as the inorganic fibers. Then, the honeycomb structures 10 were produced in the same manner as in the example 1 except for using the same silica alumina fibers as the honeycomb unit 11 as silica alumina fibers of the seal layer 14 and coating layer 16. The inorganic fibers (type, diameter, length, aspect ratio, particle diameter), unit shape and unit cross-section area of the examples 30 to 34 are shown in Table 2. In all the samples shown in Table 2, the inorganic particles are γ-alumina particles, and the inorganic binder is silica sol (solid content: 30% by weight). Also, the unit area ratio is 93.5% and the seal layer area ratio is 6.5%. The shapes of the honeycomb unit assemblies of the examples 30 to 34 are the same as those of FIG. 3(a).

Example 39

As shown in Table 3, the honeycomb structure 10 was produced in the same manner as in the example 1 except for using the alumina sol (solid content: 30% by weight) as the inorganic binder.

Examples 40 and 41

The honeycomb structures 10 were produced in the same manner as in the example 1 except for using sepiolite and attapulgite as the inorganic binder. Specifically, the processes of examples 40 and 41 mixed 40% by weight of γ-alumina particles (average particle diameter: 2 μm), 10% by weight of silica alumina fibers (average fiber diameter: 10 μm, average fiber length: 100 μm, aspect ratio: 10), 15% by weight of the

TABLE 2

| Sample[1] | Inorganic fibers | | | | Unit shape cm | Unit cross section area[2] cm² |
|---|---|---|---|---|---|---|
| | Type | Diameter μm | Length μm | Aspect ratio | | |
| Example 1 | Silica alumina fiber | 10 | 100 | 10 | 3.43 cm square | 11.8 |
| Example 30 | Silica alumina fiber | 5 | 50 | 10 | 3.43 cm square | 11.8 |
| Example 31 | Silica alumina fiber | 10 | 20 | 2 | 3.43 cm square | 11.8 |
| Example 32 | Silica alumina fiber | 10 | 5000 | 500 | 3.43 cm square | 11.8 |
| Example 33 | Silica alumina fiber | 10 | 10000 | 1000 | 3.43 cm square | 11.8 |
| Example 34 | Silica alumina fiber | 10 | 20000 | 2000 | 3.43 cm square | 11.8 |

[1]Inorganic particle = γ-alumina particles
[2]Unit area ratio = 93.5%
Area ratio of seal layer + Area ratio of coating layer = 6.5%

Examples 35 to 38

The honeycomb structures 10 were produced in the same manner as in the example 1 except for changing the cross section area of the honeycomb unit 11 and the thickness of the seal layer with which the honeycomb units 11 were joined as shown in Table 3. The type of inorganic binder, unit cross section area, thickness of the seal layer, unit area ratio, seal layer area ratio and firing temperature of the honeycomb unit 11, of the honeycomb structure 10 of the examples 35 to 42 are shown in Table 3. In all the samples shown in Table 3, the inorganic particles are γ-alumina particles (average particle diameter: 2 μm), and the inorganic fibers are silica alumina fibers (average fiber diameter: 10 μm, average fiber length: 100 μm, aspect ratio: 10). The shapes of the honeycomb unit assemblies of the examples 35 to 36 are the same as those of FIG. 3(a), and the shapes of the honeycomb unit assemblies of the examples 37 to 38 are the same as those of FIG. 3(c).

inorganic binder, and 35% by weight of water, added an organic binder, a plasticizer and a lubricant in the same manner as in the example 1, molded and fired to obtain the honeycomb units 11. Next, the multiple honeycomb units 11 were joined with the same sealing paste as that of the example 1, and the honeycomb unit assembly was cut in the same manner as in the example 1. The coating layer 16 was formed to obtain the cylindrical honeycomb structure 10 (143.8 mmφ in diameter×150 mm in height).

Example 42

The honeycomb structure 10 was produced in the same manner as in the example 1 except for mixing no inorganic binder as shown in Table 3. Specifically, the process of examples 42 mixed 50% by weight of γ-alumina particles (average particle diameter: 2 μm), 15% by weight of silica

TABLE 3

| Sample[1] | Inorganic binder type | Unit cross section area cm² | Seal layer thickness mm | Unit area ratio % | Seal layer area ratio[2] % | Firing temperatur ° C. |
|---|---|---|---|---|---|---|
| Example 35 | Silica sol | 11.8 | 2.0 | 89.3 | 10.7 | 800 |
| Example 36 | Silica sol | 11.8 | 3.0 | 84.8 | 15.2 | 800 |
| Example 37 | Silica sol | 5.0 | 2.0 | 83.5 | 16.5 | 800 |
| Example 38 | Silica sol | 5.0 | 1.5 | 86.8 | 13.2 | 800 |
| Example 39 | Alumina sol | 11.8 | 1.0 | 93.5 | 6.5 | 800 |
| Example 40 | Sepiolite | 11.8 | 1.0 | 93.5 | 6.5 | 800 |
| Example 41 | Attapulgite | 11.8 | 1.0 | 93.5 | 6.5 | 800 |
| Example 42 | — | 11.8 | 1.0 | 93.5 | 6.5 | 1000 |

[1]Inorganic particles = γ-alumina particles
Inorganic fibers = silica alumina fibers (diameter: 10 μm, length: 100 μm, aspect ratio: 10)
[2]The area of a coating layer is included.

alumina fibers (average fiber diameter: 10 µm, average fiber length: 100 µm, aspect ratio: 10), and 35% by weight of water, added the organic binder, the plasticizer and the lubricant in the same manner as in the example 1, molded and fired the molded body at 1000° C. to obtain the honeycomb unit 11. Next, the multiple honeycomb units 11 were joined with the same sealing paste as that of the example 1, and the honeycomb unit assembly was cut in the same manner as in the example 1. The coating layer 16 was formed to obtain the cylindrical honeycomb structure 10 (143.8 mmφ in diameter× 150 mm in height). All the shapes of the honeycomb unit assemblies of the examples 39 to 42 are the same as those of FIG. 3(a).

Examples 43 to 46

The honeycomb structures 10 were produced in the same manner as in the example 1 except for changing the surface roughness Rz. In the examples 43 and 44, the outer face 13 was subjected to polish processing after producing the honeycomb unit 11 in accordance with the same process as that of the example 1. In the example 43, the outer face 13 was subjected to polish processing for 0.5 minutes by a polishing apparatus using a grindstone including an alumina abrading agent (central particle diameter: about 5 µm; #3000) manufactured by Sanshokenmazai. In the example 44, the outer face 13 was subjected to polish processing for 3 minutes by the polishing apparatus using the same grindstone as that of the example 43. In the examples 45 and 46, the outer face 13 was subjected to sandblast processing after preparing the honeycomb unit 11 in accordance with the same process as that of the example 1. In the example 45, the outer face 13 was subjected to blast processing for 1 minute by a sandblast apparatus using alumina abrading agent AF180 (alundum; central particle diameter: about 90 µm) manufactured by Sanshokenmazai as loose abrasive grains. In the example 46, the outer face 13 was subjected to sandblast processing for 5 minutes using the same loose abrasive grains and sandblast apparatus as that of the example 45. The outer faces 13 of the honeycomb units 11 of the examples 1 to 5 were not subjected to polish processing and blast processing. All the shapes of the honeycomb unit assemblies of the examples 43 to 46 are the same as those of FIG. 3(a).

[Measurement of Specific Surface Area]

The specific surface areas of the honeycomb units 11 of the examples 1 to 46 were measured. The measurement process first measured the volumes of the honeycomb unit 11 and seal layer, and calculated a ratio A (% by volume) of the volume of the component material of the unit to the volume of the honeycomb structure. The measurement process then measured a BET specific surface area B ($m^2/g$) per unit weight of the honeycomb unit 11. The BET specific surface area was measured with a BET measurement apparatus (Micromeritics Flow Sorb II-2300 manufactured by Shimadzu Corporation) according to a BET one point method in conformity with Japanese Industrial Standards JIS-R-1626 (1996). The contents of JIS-R-1626 (1996) are incorporated by reference herein. Each cylindrical sample piece (15 mmφ in diameter× 15 mm in height) was used for the measurement. The measurement process then computed an apparent density C (g/L) of the honeycomb unit 11 from the weight and apparent volume of the honeycomb unit 11 and calculated a specific surface area S ($m^2/L$) per unit volume of the honeycomb structure according to Equation (1) given below. The specific surface area of the honeycomb structure represents the specific surface area per the apparent volume of the honeycomb structure.

$$S(m^2/L)=(A/100) \times B \times C;$$ Equation (1)

[Thermal Shock and Vibration Repeating Test]

Figure 5:
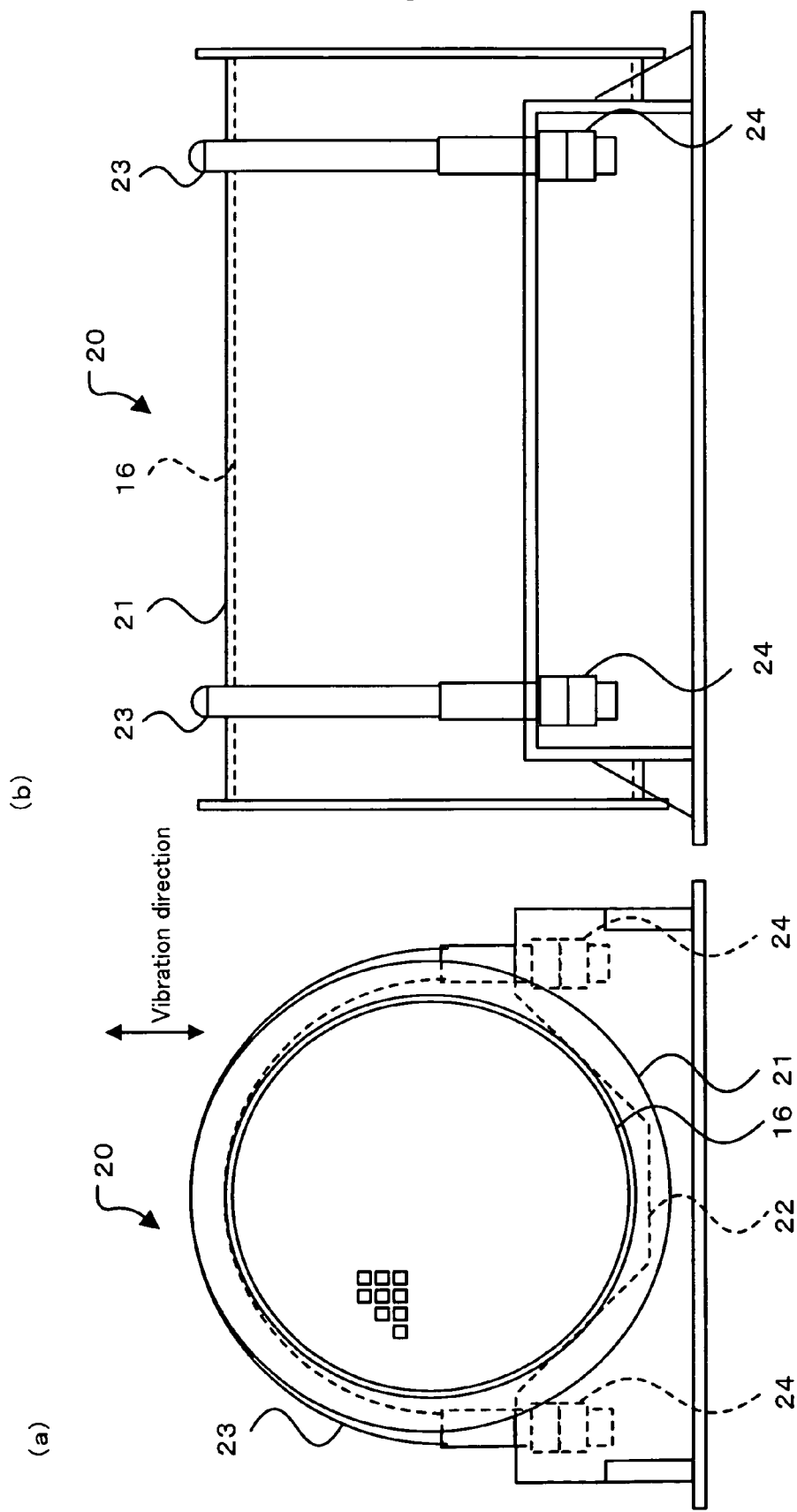
FIG. 5 schematically illustrates a vibrator apparatus 20.

The thermal shock and vibration repeating tests of the honeycomb structures of the examples 1 to 46 were performed. In the thermal shock test, a metal casing 21 was put into a firing furnace set to 600° C. in a state where an alumina mat (MAFTEC, manufactured by Mitsubishi Chemical, 46.5 cm×15 cm×6 mm in thickness) of a thermal insulation made of the alumina fiber was wound around the outer circumferential face of the honeycomb structure and was put into the metal casing 21, and was heated for 10 minutes. The metal casing 21 was taken out from the firing furnace, and rapidly cooled to room temperature. Next, the vibration test was performed, while the honeycomb structure was put into the metal casing. FIG. 5 schematically illustrates a vibrator apparatus 20 used for vibration test. FIG. 5(a) is an front view thereof and FIG. 5(b) is a side view thereof. The metal casing 21 in which the honeycomb structure was put was placed on a pedestal 22, and the metal casing 21 was fixed by fastening a fixing fixture 23 having nearly a U-shape by a screw 24. Then, the metal casing 21 could be vibrated in a state that the metal casing 21 is integrated with the pedestal 22 and the fixing fixture 23. The vibration test was performed under conditions of a frequency of 160 Hz, acceleration of 30 G, amplitude of 0.58 mm, retention time of 10 hours, room temperature and vibrating direction of the Z axial direction (up and down). The thermal shock test and vibration test were alternately and respectively repeated 10 times. The weight T0 of the honeycomb structure before the test and the weight Ti

TABLE 4

| Sample[1] | Inorganic particles | Unit shape cm | Unit cross section area cm² | Unit area ratio % | Seal layer area ratio[2] % | Surface roughness Rz µm |
|---|---|---|---|---|---|---|
| Example 1 | Alumina | 3.43 cm square | 11.8 | 93.5 | 6.5 | 13.6 |
| Example 2 | Alumina | 2.00 cm square | 4.0 | 89.7 | 10.3 | 15.8 |
| Example 3 | Alumina | 2.24 cm square | 5.0 | 90.2 | 9.8 | 14.9 |
| Example 4 | Alumina | 7.09 cm fan | 39.5 | 96.9 | 3.1 | 12.0 |
| Example 5 | Alumina | 7.10 cm square | 50.0 | 95.5 | 4.5 | 12.4 |
| Example 43 | Alumina | 3.43 cm square | 11.8 | 93.5 | 6.5 | 5.0 |
| Example 44 | Alumina | 3.43 cm square | 11.8 | 93.5 | 6.5 | 4.2 |
| Example 45 | Alumina | 3.43 cm square | 11.8 | 93.5 | 6.5 | 50.0 |
| Example 46 | Alumina | 3.43 cm square | 11.8 | 93.5 | 6.5 | 55.0 |

[1]Inorganic fibers = silica alumina fibers (diameter: 10 µm, length: 100 µm, Aspect Ratio: 10)
[2]The area of a coating layer is included after the test were measured, and the rate G of weight reduction was calculated using the following Equation (2).

$$G(\% \text{ by weight}) = 100 \times (T0 - Ti)/T0; \quad \text{Equation (2)}$$

[Pressure Loss Measurement]

Figure 6:
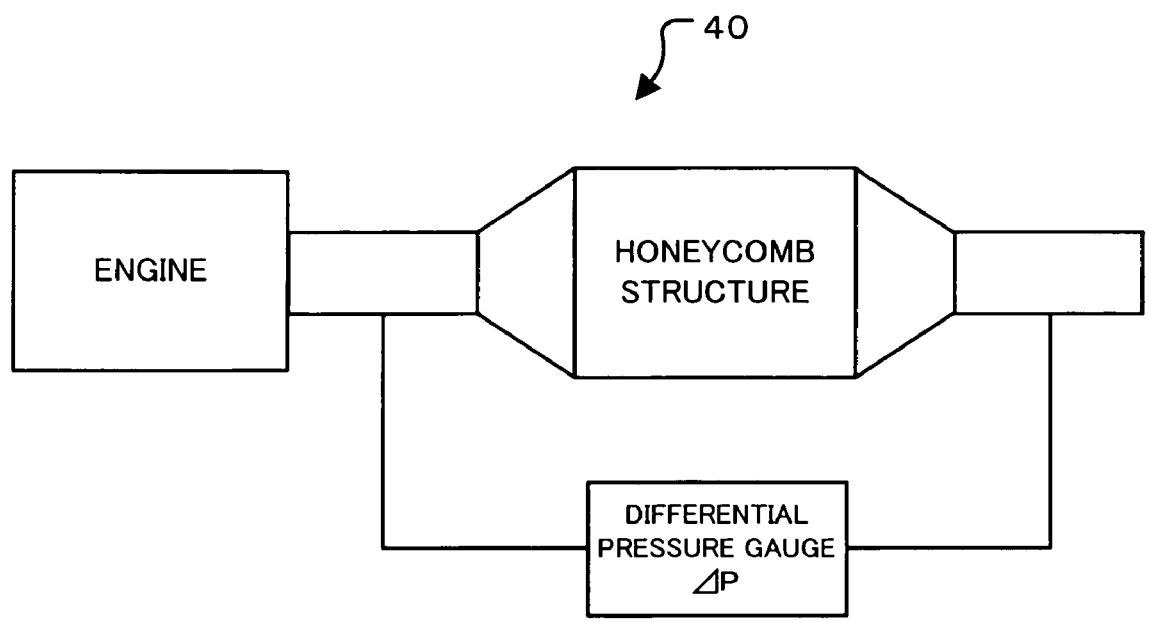
FIG. 6 schematically illustrates a pressure loss measurement apparatus 40.

The pressure loss measurements of the honeycomb structures of the examples 1 to 46 were performed. A pressure loss measurement apparatus 40 is shown in FIG. 6. Referring to the measuring method, a honeycomb structure in which an alumina mat was wound around an exhaust pipe of a common rail type diesel engine of 2 L was put into a metal casing, and a pressure gauge was attached before and after the honeycomb structure. Referring to the measurement conditions, the number of rotations of an engine was set to 1500 rpm, and the torque was set to 50 μm. The differential pressure after 5 minutes from start of operation was measured.

[Surface Roughness Measurement]

The surface roughness measurements of the examples 1 to 5 and 43 to 46 were performed. The surface roughness Rz (ten-point average roughness) was calculated based on JIS-B0601: 2001 annex 1 (reference). Specifically, form tracer SV-C3000 manufactured by Mitsutoyo Corporation was used as a measuring apparatus. In an outline curve (roughness curve of former standard JIS-B0601: 1994) having a standard length obtained by applying a phase compensation band pass filter of a cutoff value λC, the sum of the average of the peak heights to the 5th from the maximum peak in descending order and average of the valley depths to the 5th, from the deepest bottom of a valley in descending order was calculated, and the sum was set to the surface roughness Rz (μm).

[Thermal Shock and Push-Out Measurement Test]

Figure 7:
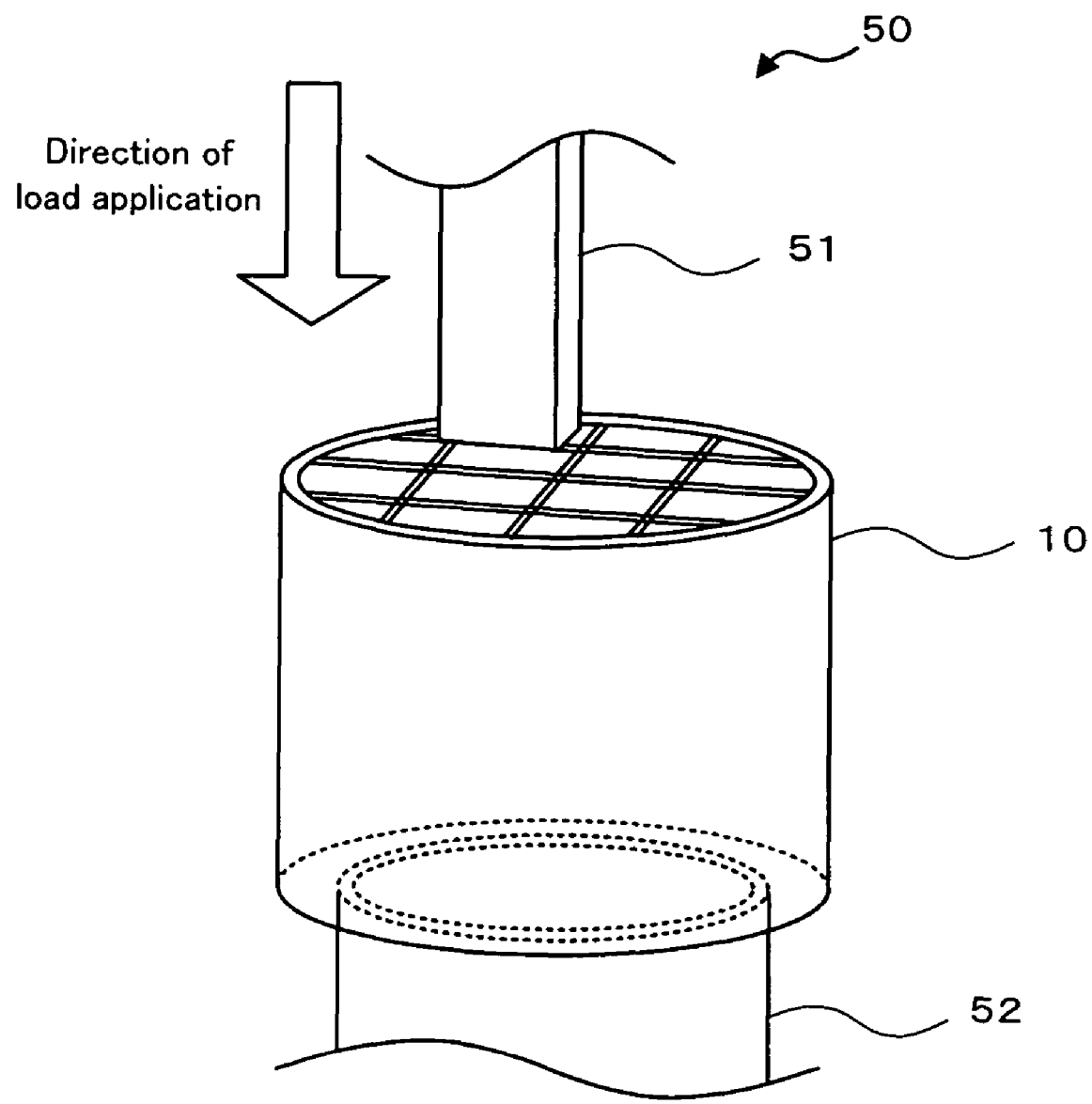
FIG. 7 schematically illustrates push-out strength measurement.

The thermal shock and push-out strength measurement tests of the honeycomb structures of the examples 1 to 5 and 43 to 46 were performed. In the thermal shock test, the honeycomb structure was put into the firing furnace set to 600° C., was heated for 10 minutes, was taken out from the firing furnace, and was rapidly cooled to room temperature. FIG. 7 schematically illustrates push-out strength measurement. In the push-out strength measurement, the honeycomb structure 10 rapidly cooled was arranged so that the forming face of the through hole 12 becomes the upper surface on a hollow cylinder 52. A load is applied from the upper surface such that a jig 51 does not cover the seal layer 14 by 1 mm of one side to the section of the honeycomb unit of a sample to be measured by a small jig 51 made of aluminum (for example, the jig 51 of 3.23 cm square in example 1 of 3.43 cm square). The strength for pushing out (destroying) the honeycomb unit located at the central part of the honeycomb structure was measured by the load measurement apparatus 50. An Instron universal testing machine (5582 type) was used for the measurement, and the measurement was performed under a condition of a weighted speed of 1 mm/min. Push-out strength was calculated from the load and the area of the jig 51 when the honeycomb structure 10 was pushed out.

[Experimental Results]

Figure 8:
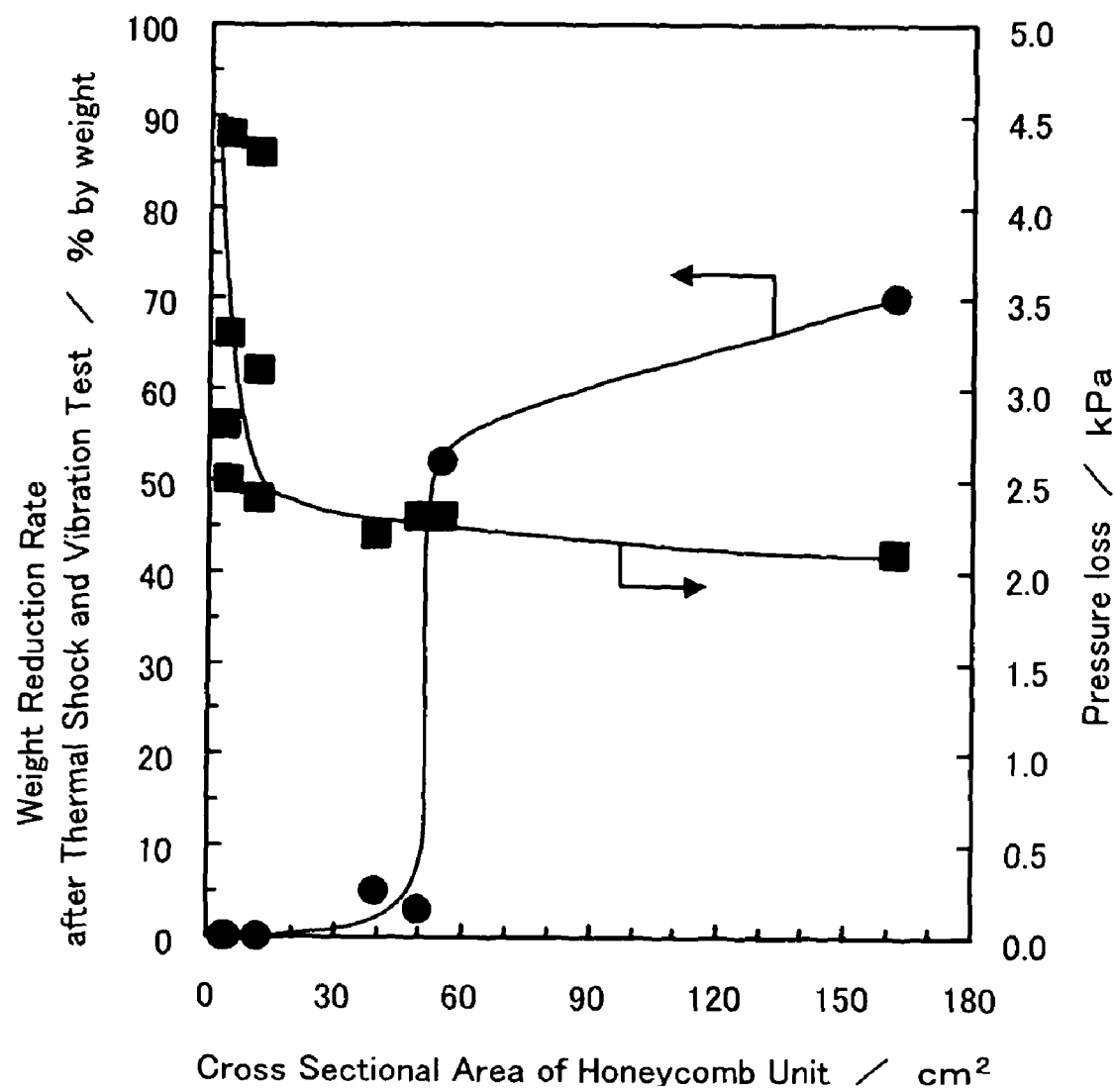
FIG. 8 shows the relationship among the cross section area, the rate of weight reduction and pressure loss of the honeycomb unit.
Figure 9:
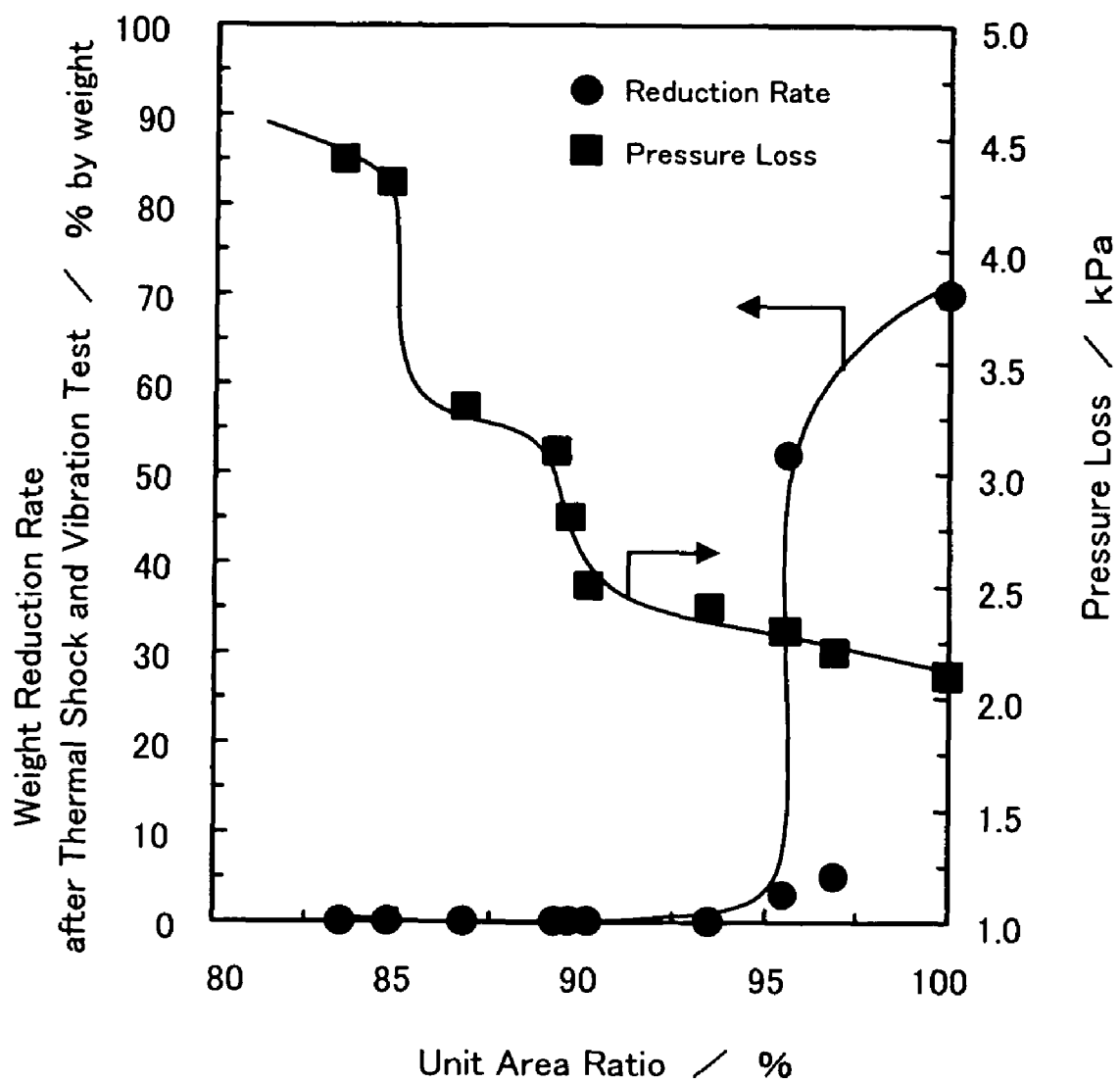
FIG. 9 shows the relationship among unit area ratio, rate of weight reduction and pressure loss.

The inorganic particle components, unit cross section area, unit area ratio and specific surface area of the honeycomb unit, specific surface area S of the honeycomb structure, rate G of weight reduction of the thermal shock and vibration repeating test, and pressure loss of the examples 1 to 29 and examples 35 to 38 are shown in Table 5. FIG. 8 shows the plots of the cross section area of the honeycomb unit as the abscissa and the rate G of weight reduction of the thermal shock and vibration repeating test and the pressure loss as the ordinate. FIG. 9 shows the plots of the unit area ratio as the abscissa and the rate G of weight reduction of the thermal shock and vibration repeating test and the pressure loss as the ordinate. The measurement results of the examples 1 to 29 and examples 35 to 38 shown in Table 5 and FIG. 8 showed clearly that the specific surface area per unit volume of the honeycomb structure was increased by using the inorganic particles, the inorganic fibers and the inorganic binder as the main components and setting the cross section area on which the through holes 12 of the honeycomb unit 11 are opened to 5 to 50 cm², and sufficient strength to thermal shocks and vibrations was obtained. As shown in FIG. 9, the measurement results showed that the specific surface area per unit volume of the honeycomb structure could be increased to the specific surface area of the honeycomb unit by using the inorganic particles, the inorganic fibers and the inorganic binder as the main components, setting the cross section area on which the through holes 12 of the honeycomb unit 11 were opened to 50 cm² or less and setting the unit area ratio to 85% or more, sufficient strength to thermal shocks and vibrations was obtained, and low pressure loss was shown. Particularly, the pressure loss was remarkably reduced in the unit area ratio of 90% or more.

TABLE 5

| Sample* | Inorganic particles | Unit Cross Section Area cm² | Unit area ratio % | Unit specific surface area m²/L | Structure specific surface area S m²/L | Reduction rate G of thermal shock and vibration test % by Weight | Pressure loss kPa |
|---|---|---|---|---|---|---|---|
| Example 1 | Alumina | 11.8 | 93.5 | 42000 | 39270 | 0 | 2.4 |
| Example 2 | Alumina | 4.0 | 89.7 | 42000 | 37674 | 0 | 2.8 |
| Example 3 | Alumina | 5.0 | 90.2 | 42000 | 37884 | 0 | 2.5 |
| Example 4 | Alumina | 39.5 | 96.9 | 42000 | 40698 | 5 | 2.2 |
| Example 5 | Alumina | 50.0 | 95.5 | 42000 | 40110 | 3 | 2.3 |
| Example 6 | Alumina | 55.0 | 95.6 | 42000 | 40152 | 52 | 2.3 |
| Example 7 | Alumina | 162.0 | 100.0 | 42000 | 42000 | 70 | 2.1 |
| Example 8 | Titania | 11.8 | 93.5 | 38000 | 35530 | 0 | 2.4 |
| Example 9 | Titania | 4.0 | 89.7 | 38000 | 34086 | 0 | 2.8 |

TABLE 5-continued

| Sample* | Inorganic particles | Unit Cross Section Area cm² | Unit area ratio % | Unit specific surface area m²/L | Structure specific surface area S m²/L | Reduction rate G of thermal shock and vibration test % by Weight | Pressure loss kPa |
|---|---|---|---|---|---|---|---|
| Example 10 | Titania | 5.0 | 90.2 | 38000 | 34276 | 0 | 2.5 |
| Example 11 | Titania | 39.5 | 96.9 | 38000 | 36822 | 7 | 2.2 |
| Example 12 | Titania | 50.0 | 95.5 | 38000 | 36290 | 5 | 2.3 |
| Example 13 | Titania | 55.0 | 95.6 | 38000 | 36328 | 63 | 2.3 |
| Example 14 | Titania | 162.0 | 100.0 | 38000 | 38000 | 90 | 2.1 |
| Example 15 | Silica | 11.8 | 93.5 | 41000 | 38335 | 0 | 2.4 |
| Example 16 | Silica | 4.0 | 89.7 | 41000 | 36777 | 0 | 2.8 |
| Example 17 | Silica | 5.0 | 90.2 | 41000 | 36982 | 0 | 2.5 |
| Example 18 | Silica | 39.5 | 96.9 | 41000 | 39729 | 4 | 2.2 |
| Example 19 | Silica | 50.0 | 95.5 | 41000 | 39155 | 3 | 2.3 |
| Example 20 | Silica | 55.0 | 95.6 | 41000 | 39196 | 42 | 2.3 |
| Example 21 | Silica | 162.0 | 100.0 | 41000 | 41000 | 65 | 2.1 |
| Example 22 | Zirconia | 11.8 | 93.5 | 41500 | 38803 | 0 | 2.4 |
| Example 23 | Zirconia | 4.0 | 89.7 | 41500 | 37226 | 0 | 2.8 |
| Example 24 | Zirconia | 5.0 | 90.2 | 41500 | 37433 | 0 | 2.5 |
| Example 25 | Zirconia | 39.5 | 96.9 | 41500 | 40214 | 5 | 2.2 |
| Example 26 | Zirconia | 50.0 | 95.5 | 41500 | 39633 | 3 | 2.3 |
| Example 27 | Zirconia | 55.0 | 95.6 | 41500 | 39674 | 57 | 2.3 |
| Example 28 | Zirconia | 162.0 | 100.0 | 41500 | 41500 | 83 | 2.1 |
| Example 29 | Cordierite + alumina | 162.0 | 100.0 | 25000 | 25000 | 0 | 2.9 |
| Example 35 | Alumina | 11.8 | 89.3 | 42000 | 37506 | 0 | 3.1 |
| Example 36 | Alumina | 11.8 | 84.8 | 42000 | 35616 | 0 | 4.3 |
| Example 37 | Alumina | 5.0 | 83.5 | 42000 | 35070 | 0 | 4.4 |
| Exaninle 38 | Alumina | 5.0 | 86.8 | 42000 | 36456 | 0 | 3.3 |

*Inorganic fibers = silica alumina fibers (diameter: 10 μm, length: 100 μm, aspect ratio: 10)

Figure 10:
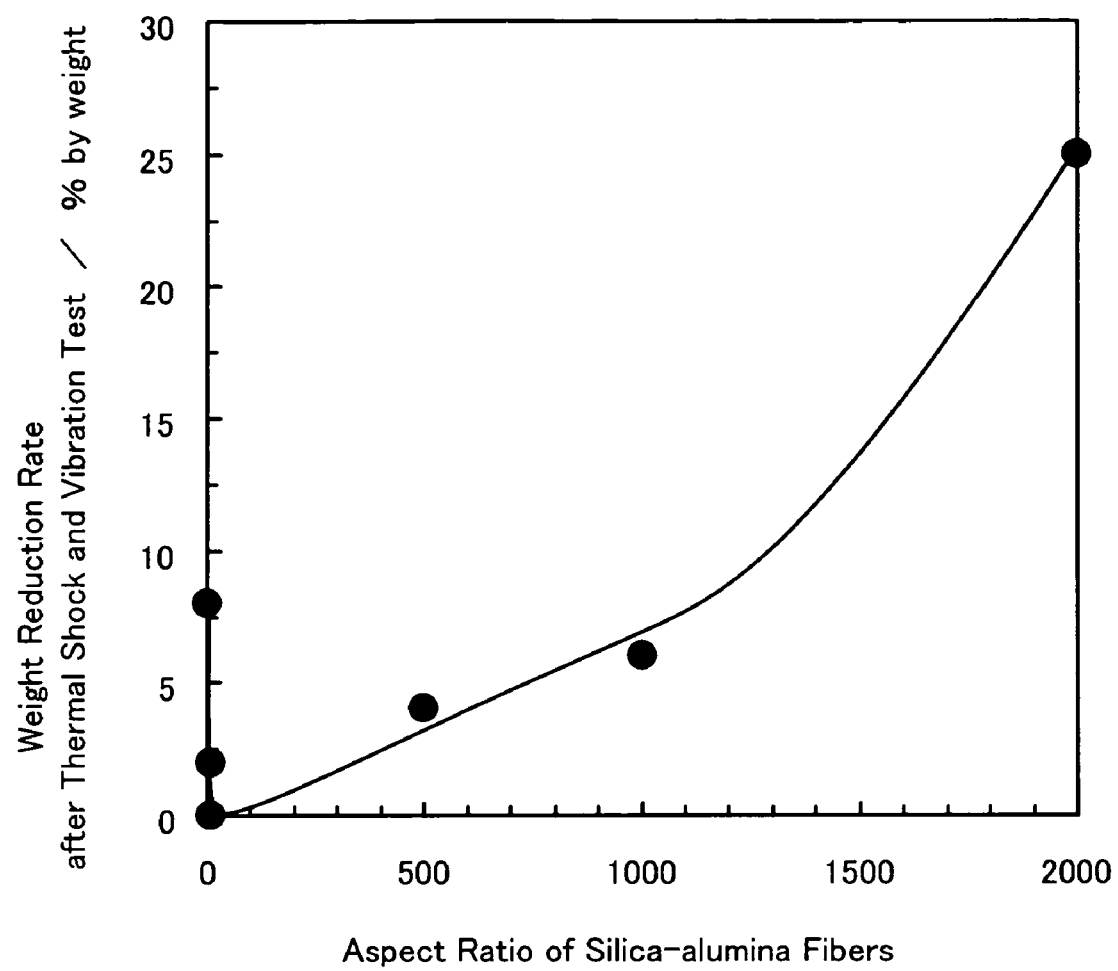
FIG. 10 shows the relationship between the aspect ratio of silica alumina fibers and rate of weight reduction.

Then, in the example 1, 30 to 34 in which the aspect ratio of the inorganic fibers was changed, the diameter, length and aspect ratio of the silica alumina fibers, and the specific surface area of the honeycomb unit 11, the specific surface area S of the honeycomb structure 10, the rate G of weight reduction of the thermal shock and vibration repeating test, and the pressure loss are shown in Table 6. FIG. 10 shows the plots of the aspect ratio of silica alumina fibers as the abscissa and the rate G of weight reduction of the thermal shock and vibration repeating test as the ordinate. The results showed that sufficient strength to thermal shocks and vibrations was obtained when the aspect ratio of inorganic fibers was within the range of 2 to 1000.

Then, in examples 39 to 41 in which the honeycomb unit 11 is produced by changing the type of inorganic binder, and the example 42 prepared without mixing the inorganic binder, the type of inorganic binder, firing temperature of the honeycomb unit 11, unit area ratio, specific surface area of the honeycomb unit, specific surface area S of the honeycomb structure, rate G of weight reduction of the thermal shock and vibration repeating test, and pressure loss are shown in Table 7. The results showed that sufficient strength was obtained by firing at comparatively high temperature when the inorganic binder was not mixed. The results showed that sufficient strength was obtained even if the honeycomb structure was fired at comparatively low temperature when the inorganic binder was mixed. The results showed that even if the alumina sol

TABLE 6

| Sample* | Silica alumina fibers | | | Unit specific surface area m²/L | Structure specific surface area S m²/L | Reduction rate G of thermal shock and vibration test % by Weight | Pressure loss kPa |
| | Diameter μm | Length μm | Aspect ratio | | | | |
|---|---|---|---|---|---|---|---|
| Example 1 | 10 | 100 | 10 | 42000 | 39270 | 0 | 2.4 |
| Example 30 | 5 | 50 | 10 | 42000 | 39270 | 2 | 2.4 |
| Example 31 | 10 | 20 | 2 | 42000 | 39270 | 8 | 2.4 |
| Example 32 | 10 | 5000 | 500 | 42000 | 39270 | 4 | 2.4 |
| Example 33 | 10 | 10000 | 1000 | 42000 | 39270 | 6 | 2.4 |
| Example 34 | 10 | 20000 | 2000 | 42000 | 39270 | 25 | 2.4 |

*Inorganic particles = γ-alumina particles and the clay binder were used as the inorganic binder, specific surface area per unit volume of the honeycomb structure 10 could be increased, and sufficient strength to thermal shocks and vibrations was obtained.

TABLE 7

| Sample* | Inorganic binder Type | Unit area ratio % | Firing temperature ° C. | Unit specific surface area m²/L | Structure specific surface area S m²/L | Reduction rate G of thermal shock and vibration test % by Weight | Pressure loss kPa |
|---|---|---|---|---|---|---|---|
| Example 39 | Alumina sol | 93.5 | 800 | 42000 | 39270 | 0 | 2.4 |
| Example 40 | Sepiolite | 93.5 | 800 | 42000 | 39270 | 0 | 2.4 |
| Example 41 | Attapulgite | 93.5 | 800 | 42000 | 39270 | 0 | 2.4 |
| Example 42 | — | 93.5 | 1000 | 40000 | 37400 | 20 | 2.4 |

Figure 11:
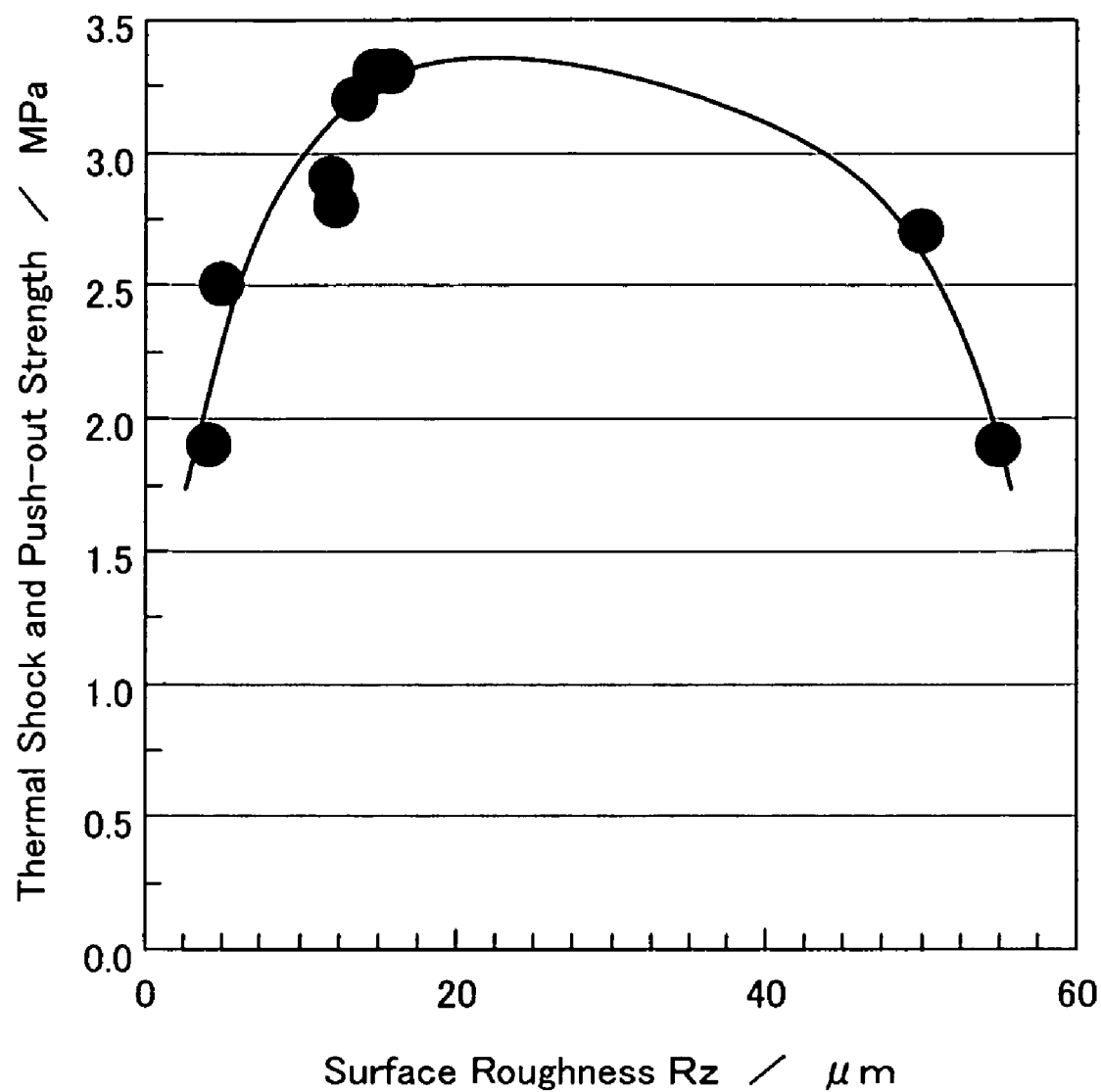
FIG. 11 shows the relationship between the surface roughness Rz of the outer face 13 and thermal shock and push-out strength.

*Inorganic particles = γ-alumina particles
Inorganic fibers = silica alumina fibers (diameter: 10 μm, length: 100 μm, aspect ratio: 10)
Unit shape = 3.43 cm square Then, in the examples 43 to 46 and examples 1 to 5 in which the honeycomb unit 11 is produced by changing the surface roughness Rz of the outer face 13 of the honeycomb unit 11, the type of inorganic particles, unit cross section area, unit area ratio, specific surface area S per unit volume of the honeycomb structure, surface roughness Rz, rate G of weight reduction of the thermal shock and vibration repeating test, pressure loss, and thermal shock and push-out strength are shown in Table 8. FIG. 11 shows the plots of the surface roughness Rz as the abscissa and the thermal shock and push-out strength as the ordinate. The results showed that sufficient strength to thermal shocks and vibrations and the sufficient thermal shock and push-out strength were obtained when the surface roughness Rz is within the range of 5 to 50 μm.

TABLE 8

| Sample[1] | Inorganic particles | Unit Cross Section Area cm² | Unit area ratio % | Structure specific surface area S m²/L | Surface roughness Rz μm | Reduction rate G of thermal shock and vibration test % by Weight | Pressure loss kPa | Thermal shock and push-out strength MPa |
|---|---|---|---|---|---|---|---|---|
| Example 1 | Alumina | 11.8 | 93.5 | 39270 | 13.6 | 0 | 2.4 | 3.2 |
| Example 2 | Alumina | 4.0 | 89.7 | 37674 | 15.8 | 0 | 2.8 | 3.3 |
| Example 3 | Alumina | 5.0 | 90.2 | 37884 | 14.9 | 0 | 2.5 | 3.3 |
| Example 4 | Alumina | 39.5 | 96.9 | 40110 | 12.0 | 3 | 2.3 | 2.9 |
| Example 5 | Alumina | 50.0 | 95.5 | 40152 | 12.4 | 52 | 2.3 | 2.8 |
| Example 43 | Alumina | 11.8 | 93.5 | 39270 | 5.0 | 3 | 2.4 | 2.5 |
| Example 44 | Alumina | 11.8 | 93.5 | 39270 | 4.2 | 9 | 2.4 | 1.9 |
| Example 45 | Alumina | 11.8 | 93.5 | 39270 | 50 | 5 | 2.4 | 2.7 |
| Example 46 | Alumina | 11.8 | 93.5 | 39270 | 55 | 12 | 2.4 | 1.9 |

[1]Inorganic fibers = silica alumina fibers (diameter: 10 μm, length: 100 μm, aspect ratio: 10)
Specific surface area of unit = 42000 m2/L

[Honeycomb Catalyst]

The honeycomb structures 10 of examples 1 to 46 were soaked in a platinum nitrate solution to carry platinum as the catalyst component at a weight of 2 g/L per unit volume of the honeycomb structure 10 and was kept at 600° C. for 1 hour.

The present application claims the benefit of priority from the International Application No. PCT/JP2005/012264 filed on Jun. 27, 2005, the entire contents of which are incorporated by reference herein.

What is claimed is:

1. A honeycomb structure, comprising:
   honeycomb units, each of said honeycomb units having a plurality of through holes and two end faces, such that each of said plurality of through holes extends from one end face to another end face, all of the through holes being open on the one end face of the honeycomb unit, and each of said honeycomb units also having an outer face disposed around said plurality of through holes;
   a seal layer interposed between adjacent outer faces of each of said plurality of honeycomb units for adhering each of said honeycomb units together,
   wherein each of the honeycomb units comprises a first component having inorganic particles, and a second component chosen from inorganic fibers, inorganic whiskers, and a combination thereof, the material of the inorganic fibers and inorganic whiskers being chosen from alumina, silica, silicon carbide, silica alumina, potassium titanate, and aluminum borate,
   wherein a cross section area of each of the honeycomb units perpendicular to the through holes is about 5 to about 50 cm²; and the surface roughness Rz of the outer face is about 5 to about 50 μm, and
   wherein a ratio of the total sum of the cross section areas of the honeycomb units perpendicular to the through holes to a cross section area of the honeycomb structure perpendicular to the through holes is about 85% or more.

2. A honeycomb structure according to claim 1, wherein a ratio of the total sum of the cross section areas of the honeycomb units perpendicular to the through holes to a cross section area of the honeycomb structure perpendicular to the through holes is about 90% or more.

3. A honeycomb structure according to claim 1, wherein the surface roughness Rz of the outer face of the honeycomb unit is about 10 to about 30 µm.

4. A honeycomb structure according to claim 1, having a specific surface area of about 35000 to about 70000 $cm^2/L$.

5. A honeycomb structure according to claim 1, wherein the inorganic particles include at least one type selected from the group consisting of alumina, silica, zirconia, titania, ceria, mullite, and zeolite.

6. A honeycomb structure according to claim 1, wherein the honeycomb unit further includes an inorganic binder, and the inorganic binder includes at least one type selected from the group consisting of alumina sol, silica sol, titania sol, water glass, sepiolite, and attapulgite.

7. A honeycomb structure according to claim 1, wherein a catalyst component is carried on the honeycomb structure.

8. A honeycomb structure according to claim 1, being used for a catalytic converter for converting the exhaust gas of vehicles.

9. A honeycomb structure according to claim 1, being used for a catalytic converter for converting the exhaust gas of vehicles.

10. A honeycomb structure according to claim 1, wherein the inorganic particles are chosen from alumina particles, silica particles, zirconia particles, titania particles, ceria particles, and mullite particles, and wherein the honeycomb units comprising the first component and the second component are subject to firing at 600° C. and 1200° C.

11. A honeycomb structure according to claim 1, wherein a weight content of the second component in the honeycomb structure is from about 3% to about 70%.

12. The honeycomb structure as claimed in claim 1, wherein a weight content of the second component in the honeycomb structure is from about 3% to about 50%.

* * * * *